(12) United States Patent
Shimizu

(10) Patent No.: US 12,437,574 B2
(45) Date of Patent: Oct. 7, 2025

(54) THRESHOLD CALCULATION SYSTEM, THRESHOLD CALCULATION METHOD, AND COMPUTER PROGRAM

(71) Applicant: NEC Corporation, Tokyo (JP)

(72) Inventor: Masakazu Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 179 days.

(21) Appl. No.: 18/023,932

(22) PCT Filed: Sep. 30, 2020

(86) PCT No.: PCT/JP2020/037286
§ 371 (c)(1),
(2) Date: Feb. 28, 2023

(87) PCT Pub. No.: WO2022/070349
PCT Pub. Date: Apr. 7, 2022

(65) Prior Publication Data
US 2024/0029466 A1    Jan. 25, 2024

(51) Int. Cl.
*G06V 40/10* (2022.01)
*G06F 21/32* (2013.01)
(Continued)

(52) U.S. Cl.
CPC ............ *G06V 40/10* (2022.01); *G06F 21/32* (2013.01); *G06V 10/751* (2022.01);
(Continued)

(58) Field of Classification Search
CPC ...... G06V 40/10; G06V 40/50; G06V 10/751; G06V 10/761; G06V 30/1912; G06F 21/32
See application file for complete search history.

(56) References Cited

U.S. PATENT DOCUMENTS

2006/0210119 A1*  9/2006  Willis ................. G06F 18/2415
340/5.52
2008/0101658 A1*  5/2008  Ahern .................... G06V 10/70
382/115
(Continued)

FOREIGN PATENT DOCUMENTS

JP    2000-215313 A    8/2000
JP    2004-046697 A    2/2004
(Continued)

OTHER PUBLICATIONS

International Search Report for PCT Application No. PCT/JP2020/037286, mailed on Dec. 28, 2020.

*Primary Examiner* — John B Strege
(74) *Attorney, Agent, or Firm* — Sughrue Mion, PLLC

(57) ABSTRACT

A threshold calculation system, includes: a first acquisition unit that obtains a matching information that is used for matching of a biological body; a second acquisition unit that obtains an attribute information indicating an attribute of the biological body; a storage unit that stores the matching information and the attribute information for each biological body; a sampling unit that extracts, as sample data, a plurality of matching informations from the storage unit, on the basis of a predetermined condition about the attribute information; a population estimation unit that estimates a population from the sample data; and a threshold calculation unit that calculates a threshold related to the matching information, on the basis of a distribution of the estimated population. According to such a threshold calculation system, it is possible to properly calculate the threshold related to biometric authentication.

16 Claims, 18 Drawing Sheets

(51) Int. Cl.
*G06V 10/74* (2022.01)
*G06V 10/75* (2022.01)
*G06V 30/19* (2022.01)
*G06V 40/50* (2022.01)

(52) U.S. Cl.
CPC ........ *G06V 10/761* (2022.01); *G06V 30/1912* (2022.01); *G06V 40/50* (2022.01)

(56) References Cited

U.S. PATENT DOCUMENTS

| | | | |
|---|---|---|---|
| 2008/0240515 A1* | 10/2008 | Uno | G06F 18/2431 |
| | | | 382/115 |
| 2009/0171623 A1* | 7/2009 | Kiefer | G06N 20/00 |
| | | | 702/181 |
| 2014/0007210 A1 | 1/2014 | Murakami et al. | |
| 2017/0222809 A1 | 8/2017 | Takahashi | |
| 2017/0286746 A1* | 10/2017 | Tieu | G06V 40/1376 |
| 2018/0052984 A1* | 2/2018 | Yamada | G06F 21/32 |
| 2020/0260361 A1* | 8/2020 | Donikian | H04W 12/06 |

FOREIGN PATENT DOCUMENTS

| | | |
|---|---|---|
| JP | 2010-108074 A | 5/2010 |
| JP | 2011-044101 A | 3/2011 |
| JP | 2013-122679 A | 6/2013 |
| JP | 2016-072836 A | 5/2016 |
| JP | 2018-028815 A | 2/2018 |

* cited by examiner

THRESHOLD CALCULATION SYSTEM, THRESHOLD CALCULATION METHOD, AND COMPUTER PROGRAM

This application is a National Stage Entry of PCT/JP2020/037286 filed on Sep. 30, 2020, the contents of all of which are incorporated herein by reference, in their entirety.

TECHNICAL FIELD

The disclosure relates to a threshold calculation system a threshold calculation method, and a computer program that calculate a threshold related to biometric authentication.

BACKGROUND ART

A known system of this type determines a threshold by using a similarity distribution (a matching degree distribution) of feature quantities in order to perform biometric authentication. For example, Patent Literature 1 discloses that the threshold of each datum of registration data is generated on the basis of the matching degree distribution for each datum of the registration data. Patent Literature 2 discloses that whether to directly determine the threshold or further perform a statistical process, is determined on the basis of a similarity distribution of oneself and a similarity distribution between oneself and others. Patent Literature 3 discloses that the threshold is calculated by using a mean value and a standard deviation of the similarity distribution.

CITATION LIST

Patent Literature

Patent Literature 1: JP2000-215313A
Patent Literature 2: JP2011-044101A
Patent Literature 3: JP2004-046697A

SUMMARY

Technical Problem

The above-described Patent Literatures do not take into account unknown others (i.e., living bodies that are not registered as matching targets), and there is room for improvement.

It is an example object of the disclosure to provide a threshold calculation system, a threshold calculation method, and a computer program that are capable of solving the problems described above.

Solution to Problem

A threshold calculation system according to an example aspect of this disclosure includes: a first acquisition unit that obtains a matching information that is used for matching of a biological body; a second acquisition unit that obtains an attribute information indicating an attribute of the biological body or an attribute of the matching information; a storage unit that stores the matching information and the attribute information for each biological body; a sampling unit that extracts, as sample data, a plurality of matching informations from the storage unit, on the basis of a predetermined condition about the attribute information; a population estimation unit that estimates a population from the sample data; and a threshold calculation unit that calculates a threshold related to the matching information, on the basis of a distribution of the estimated population.

A threshold calculation method according to an example aspect of this disclosure includes: obtaining a matching information that is used for matching of a biological body; obtaining an attribute information indicating an attribute of the biological body or an attribute of the matching information; storing the matching information and the attribute information for each biological body; extracting, as sample data, a plurality of matching informations from the storage unit, on the basis of a predetermined condition about the attribute information; estimating a population from the sample data; and calculating a threshold related to the matching information, on the basis of a distribution of the estimated population.

A computer program according to an example aspect of this disclosure operates a computer: to obtain a matching information that is used for matching of a biological body; to obtain an attribute information indicating an attribute of the biological body or an attribute of the matching information; to store the matching information and the attribute information for each biological body; to extract, as sample data, a plurality of matching informations from the storage unit, on the basis of a predetermined condition about the attribute information; to estimate a population from the sample data; and to calculate a threshold related to the matching information, on the basis of a distribution of the estimated population.

EXAMPLE EMBODIMENTS

Hereinafter, a threshold calculation system, a threshold calculation method, and a computer program according to example embodiments will be described with reference to the drawings.

First Example Embodiment

A threshold calculation system according to a first example embodiment will be described with reference to FIG. 1 to FIG. 6C.

(Hardware Configuration)

Figure 1:
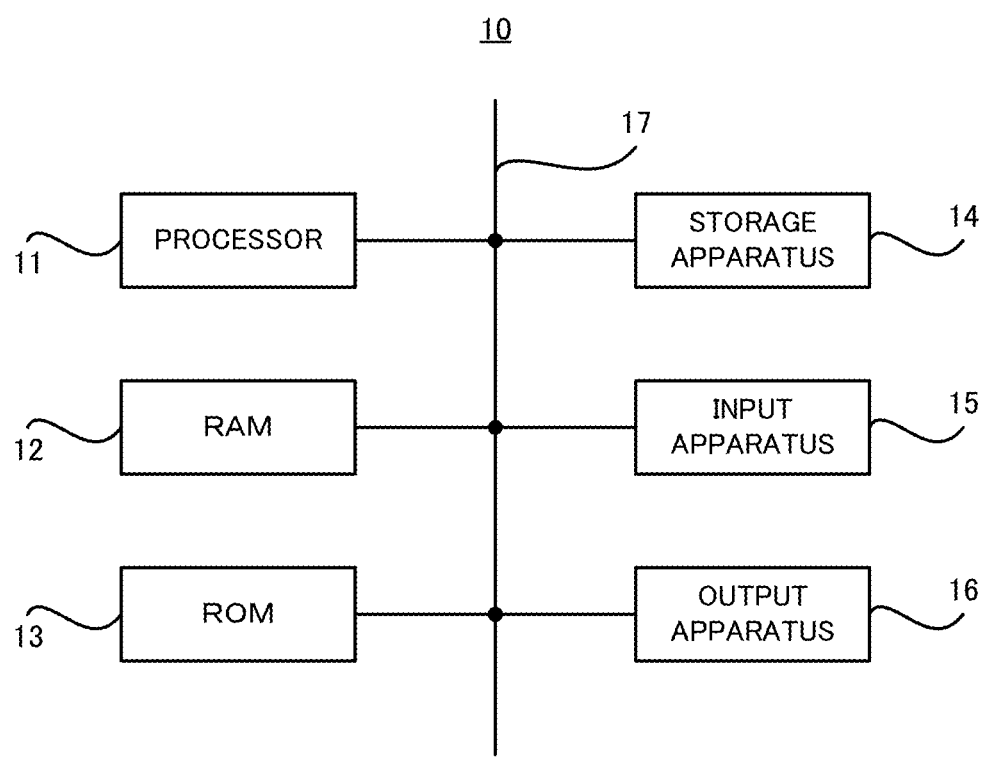
FIG. 1 is a block diagram illustrating a hardware configuration of a threshold calculation system according to a first example embodiment.

First, a hardware configuration of the threshold calculation system according to the first example embodiment will be described with reference to FIG. 1. FIG. 1 is a block diagram illustrating the hardware configuration of the threshold calculation system according to the first example embodiment.

As illustrated in FIG. 1, a threshold calculation system 10 according to the first example embodiment includes a processor 11, a RAM (Random Access Memory) 12, a ROM (Read Only Memory) 13, and a storage apparatus 14. The threshold calculation system 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer readable recording medium by using a not-illustrated recording medium reading apparatus. The processor 11 may obtain (i.e., may read) a computer program from a not-illustrated apparatus that is located outside the threshold calculation system 10 through a network interface. The processor 11 controls the RAM 12, the storage apparatus 14, the input apparatus 15, and the output apparatus 16 by executing the read computer program. Especially in the example embodiment, when the processor 11 executes the read computer program, a functional block for calculating a threshold related to biometric authentication is realized or implemented in the processor 11. As the processor 11, one of a CPU (Central Processing Unit), a GPU (Graphics Processing Unit), a FPGA (field-programmable gate array), a DSP (Demand-Side Platform), and an ASIC (Application Specific Integrated Circuit may be used, or a plurality of them may be used in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the threshold calculation system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the threshold calculation system 10. The input apparatus 15 may include, for example, at least one of a keyboard, a mouse, and a touch panel.

The output apparatus 16 is an apparatus that outputs information about the threshold calculation system 10 to the outside. For example, the output apparatus 16 may be a display apparatus (e.g., a display) that is configured to display the information about the threshold calculation system 10.

(Functional Configuration)

Figure 2:
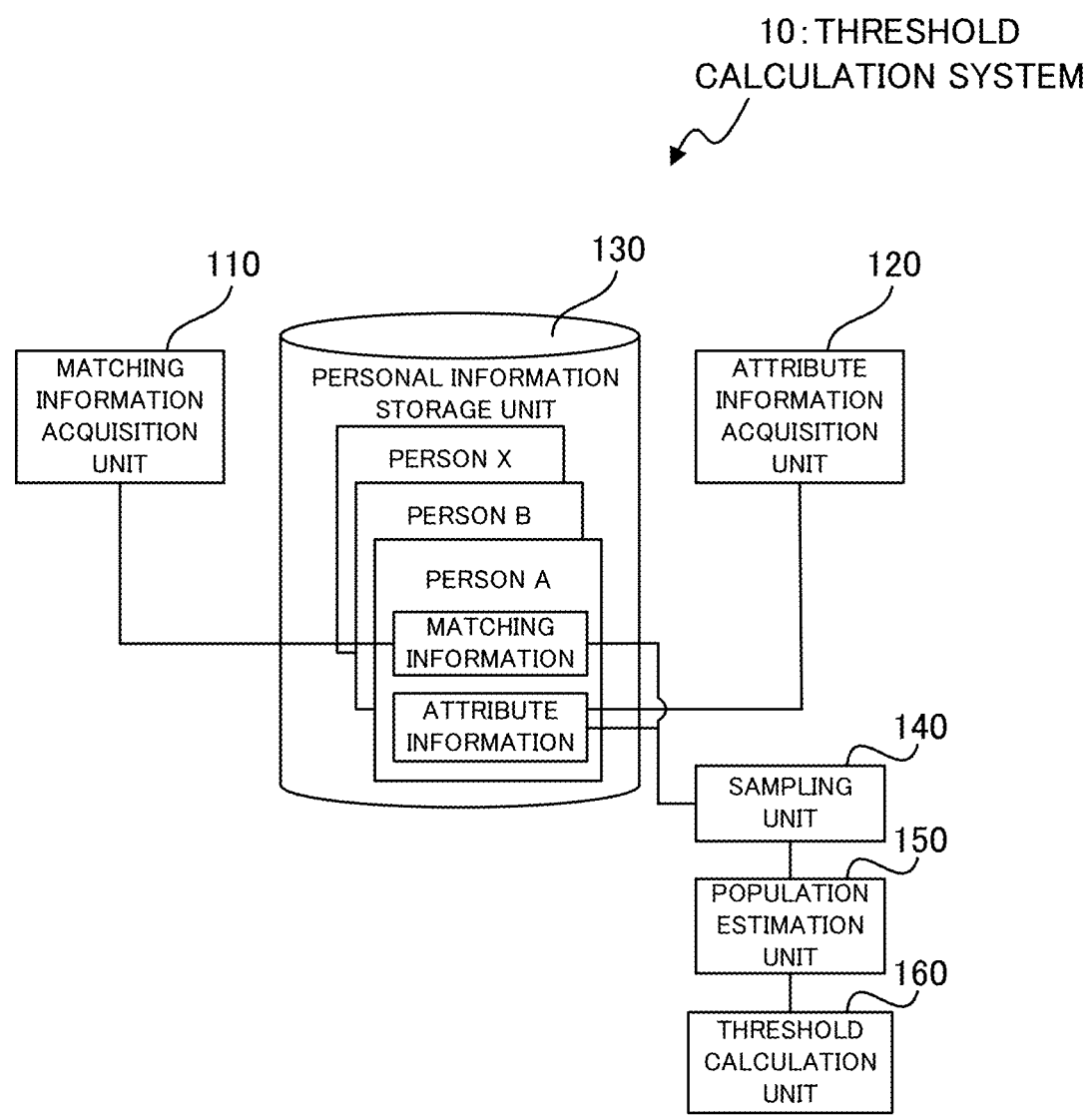
FIG. 2 is a block diagram illustrating a functional configuration of the threshold calculation system according to the first example embodiment.

Next, with reference to FIG. 2, a functional configuration of the threshold calculation system 10 according to the first example embodiment will be described. FIG. 2 is a block diagram illustrating the functional configuration of the threshold calculation system according to the first example embodiment.

As illustrated in FIG. 2, the threshold calculation system 10 according to the first example embodiment includes, as processing blocks for realizing its function, a matching information acquisition unit 110, an attribute information acquisition unit 120, a personal information storage unit 130, a sampling unit 140, a population estimation unit 150, and a threshold calculation unit 160. Each of the matching information acquisition unit 110, the attribute information acquisition unit 120, the sampling unit 140, the population estimation unit 150, and the threshold calculation unit 160 may be realized or implemented by the processor 11 (see FIG. 1). The personal data storage unit 130 may be realized or implemented by the storage apparatus 14 (see FIG. 1).

The matching information acquisition unit 110 is configured to obtain a matching information used for an authentication operation for a biological body (specifically, a matching operation of matching with registered data). The matching information acquisition unit 110 may be configured to directly obtain the matching information, or may be configured to calculate the matching information by using obtained information. A specific example of the matching information will be described in other example embodiments described below. The matching information obtained by the matching information acquisition unit 110 is configured to be outputted to the personal information storage unit 130.

The attribute information acquisition unit 120 is configured to obtain an attribute information indicating an attribute of a biological body or an attribute of the matching information. The attribute information acquisition unit 110 may directly obtain the attribute information, or may determine and obtain the attribute from obtained information. A specific example of the attribute information will be described in other example embodiments described below. The attribute information obtained by the attribute information acquisition unit 120 is configured to be outputted to the personal information storage unit 130.

The personal information storage unit 130 is configured to store the matching information obtained by the matching information acquisition unit 110 and the attribute information obtained by the attribute information acquisition unit 120. The personal information storage unit 130 is configured to store a plurality of matching informations and attribute informations for each biological body (for example, FIG. 2 exemplifies that the matching information and the attribute information are stored for each of a person A, a person B, and a person X, separately). It is possible to read out the matching information and the attribute information stored in the personal information storage unit 130, by using the sample extraction unit 140, as appropriate. The personal information storage unit 130 may have a function of partially (e.g., in units of living bodies) deleting the stored matching information and attribution information.

The sampling unit 140 is configured to extract a part or all of the matching information stored in the personal information storage unit 130, as sample data for estimating a population. The sample extraction unit 140 is configured to extract the sample data on the basis of a predetermined condition about the attribute information (hereinafter referred to as a "population condition" as appropriate). The population condition is a condition that is set, for example, on the basis of a population that is assumed as an authentication target. A parameter that is set as the population condition may be, for example, a confidence coefficient $(1-\alpha_\mu)$ for calculating a confidence interval of a population mean, or a confidence coefficient $(1-\alpha_o)$ for calculating a confidence interval of the population. A more specific example of the population condition will be described in the example embodiments described later. The sample data extracted by the sample extraction unit 140 is configured to be outputted to the population estimation unit 150.

The population estimation unit 150 is configured to estimate the population by using the sample data extracted by the sample extraction unit 140. The population here includes unknown others that are not stored in the personal information storage unit 130, and is calculated as being capable of calculating a threshold related to the matching information. Information about the population estimated by the population estimation unit 150 is configured to be outputted to the threshold calculation unit 160.

The population estimation unit 150 may calculate, for example, an interval upper limit value corresponding to the confidence coefficient $(1-\alpha_o)$. Specifically, the population estimation unit 150 calculates a sample mean $x_{AVE}$, an unbiased variance $U^2$, and an unbiased standard deviation $U_S$ from the sample data by using the number of elements $n_E$ of the sample data. Subsequently, the population estimation unit 150 calculates a confidence interval of a population mean $\mu$ from the calculated sample mean $x_{AVE}$, unbiased variance $U^2$, number of elements $n_E$, and confidence coefficient $(1-\alpha_\mu)$. In this case, if the number of elements $n_E$ is large enough, the population mean $\mu$ may be the sample mean $x_{AVE}$. Then, the population estimation unit 150 calculates the interval upper limit corresponding to the confidence coefficient $(1-\alpha_o)$ by using the unbiased standard deviation $U_S$ that is an unbiased estimate of the population mean $\mu$ and a population standard deviation 6.

The threshold calculation unit 160 is configured to calculate the threshold used for biometric authentication using the matching data, on the basis of a distribution of the population estimated by the population estimation unit 150. For example, when the population estimation unit 150 calculates the interval upper limit value corresponding to the confidence coefficient $(1-\alpha_o)$, the threshold calculation unit 160 may set a value that is greater than or equal to the calculated interval upper limit value, as the threshold. The threshold calculation unit 160 may store the calculated threshold in the personal information storage unit 130. When the threshold is already stored in the personal information storage unit 130, the threshold calculation unit 160 may rewrite (i.e., updated) the threshold with a new threshold. The threshold calculation unit 160 may have a function of notifying a system manager that the threshold is calculated (updated).

(Registration Operation)

Figure 3:
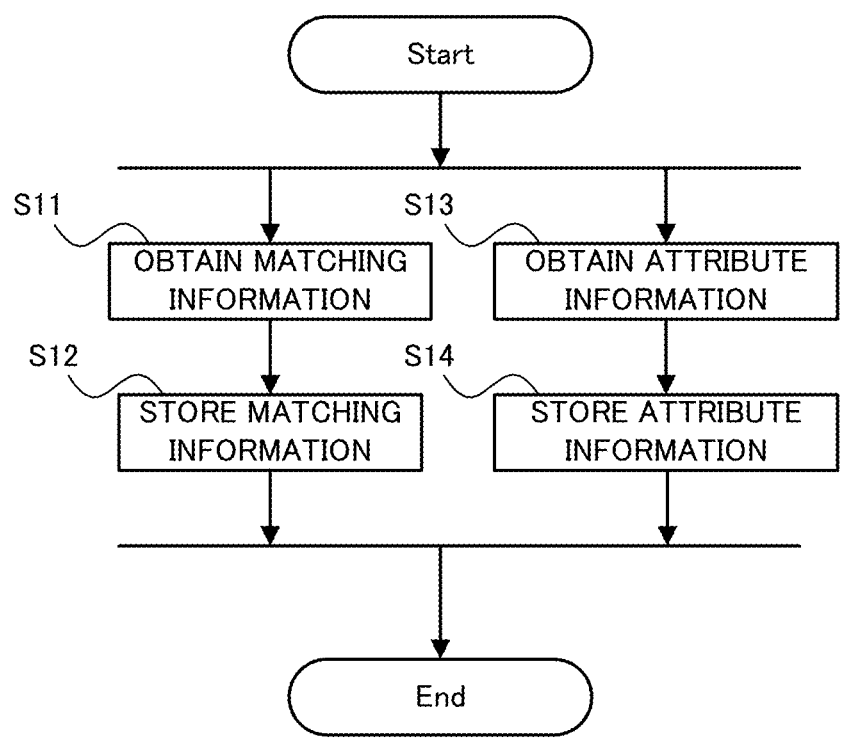
FIG. 3 is a flowchart illustrating a flow of a registration operation in the threshold calculation system according to the first example embodiment.

Next, with reference to FIG. 3, a flow of an operation of registration of a personal information by the threshold calculation system 10 according to the first example embodiment (i.e., an operation of storing the matching information and the attribute information about a biological body in the personal information storage unit 130) will be described. FIG. 3 is a flowchart illustrating the flow of the registration operation in the threshold calculation system according to the first example embodiment.

As illustrated in FIG. 3, in the registration operation performed by the threshold calculation system 10 according to the first example embodiment, first, the matching information acquisition unit 110 obtains the matching information about a biological body (step S11). Then, the matching information acquisition unit 110 stores the obtained matching information in the personal information storage unit 130 (step S12).

In parallel with the step S11 and the step S12 described above, the attribute information acquisition unit 120 obtains the attribute information indicating the attribute of the biological body or the attribute of the matching information (step S13). The attribute information acquisition unit 120 stores the obtained attribute information in the personal information storage unit 130 (step S14). The matching information and the attribution information are stored in such a condition that they are associated with each biological body.

A series of processing steps described above is repeatedly performed for each biological body to be registered. Consequently, the personal information storage unit 130 stores the matching informations and the attribute informations on a plurality of living bodies in units of living bodies.

(Threshold Calculation Operation)

Figure 4:
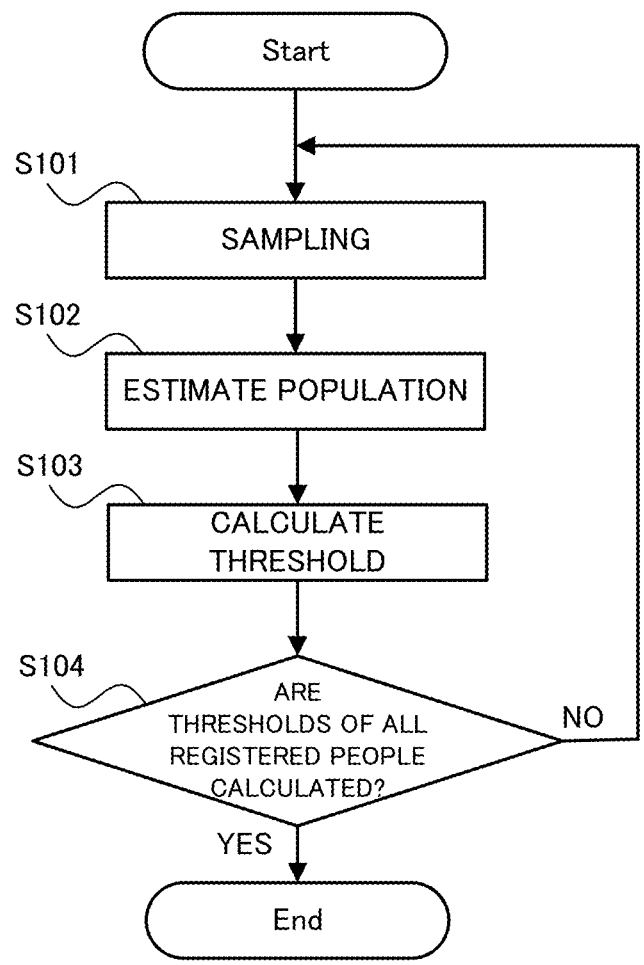
FIG. 4 is a flowchart illustrating a flow of a threshold calculation operation in the threshold calculation system according to the first example embodiment.

Next, with reference to FIG. 4, a flow of a threshold calculation operation by the threshold calculation system 10 according to the first example embodiment will be described. FIG. 4 is a flowchart illustrating the flow of the threshold calculation operation in the threshold calculation system according to the first example embodiment.

As illustrated in FIG. 4, in the threshold calculation operation by the threshold calculation system 10 according to the first example embodiment, first, the sampling unit 140 extracts the matching information stored in the personal information storage unit 130, as the sample data, on the basis of the population condition (step S101). Subsequently, the population estimation unit 150 estimates the population by using the extracted sample data (step S102).

Subsequently, the threshold calculation unit 160 calculates the threshold from the distribution of the estimated population (step S103). The threshold calculation unit 160 typically calculates the threshold for each biological body. The threshold calculation unit 160, however, may create a cluster in units of particular attributes, may calculate a maximum value or a mean value of thresholds of living bodies that belong to the cluster, and may set the threshold(s) in units of clusters. The threshold calculation unit 160 may set one threshold in the entire personal information storage unit 130.

Then, the threshold calculation system 10 according to the first example embodiment determines whether or not the threshold is calculated for all of registered people (i.e., all of the living bodies stored in the personal data storage unit (step S104). Then, when it is determined that the threshold is not calculated for all of the registered people (the step S104: NO), the threshold calculation system 10 repeats the processing steps from the step S101. On the other hand, when it is determined that the threshold is calculated for all of the registered people (the step S104: YES), the threshold calculation system 10 ends the series of processing steps.
(Technical Effect)

Figure 5:
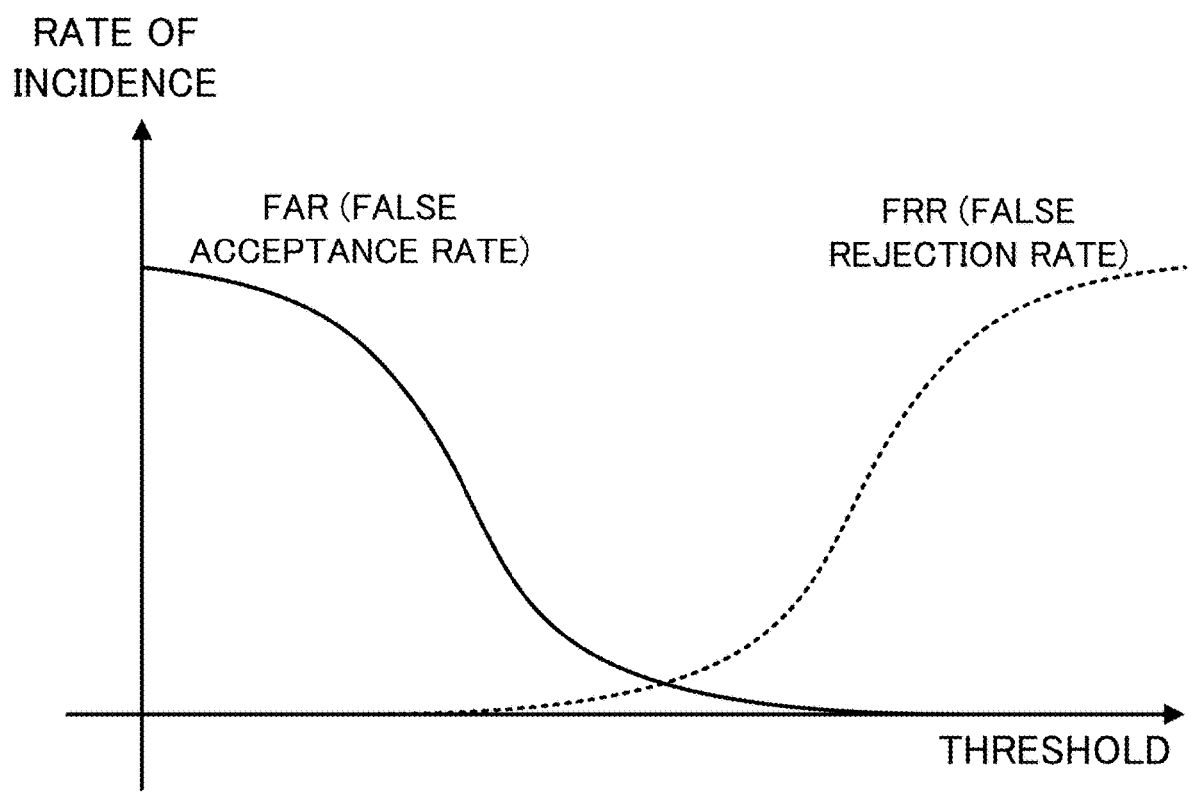
FIG. 5 is a graph illustrating a relationship between a threshold and a FAR (False Acceptance Rate) and/or a FRR (False Rejection Rate).
Figure 6A:
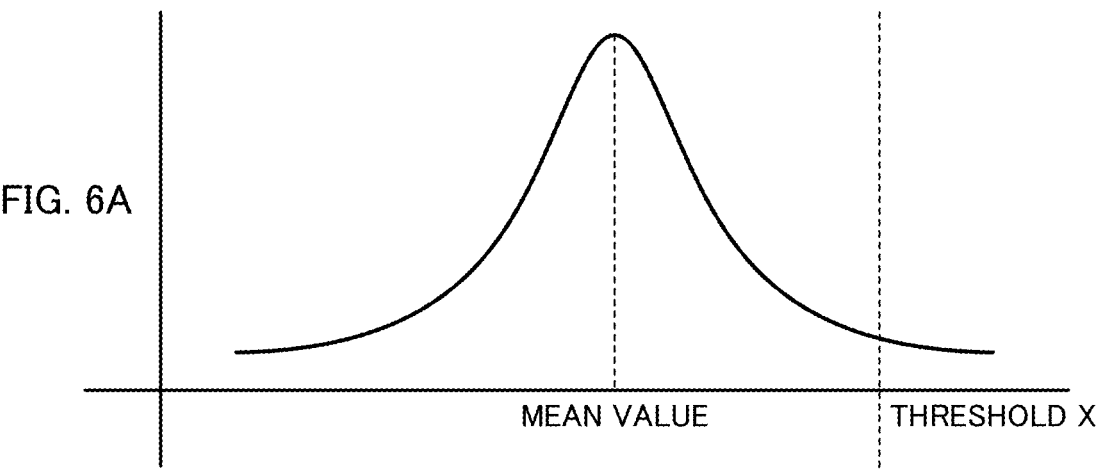
FIG. 6A to FIG. 6C are graphs illustrating a difference in an ideal threshold due to a difference in a sample distribution.
Figure 6B:
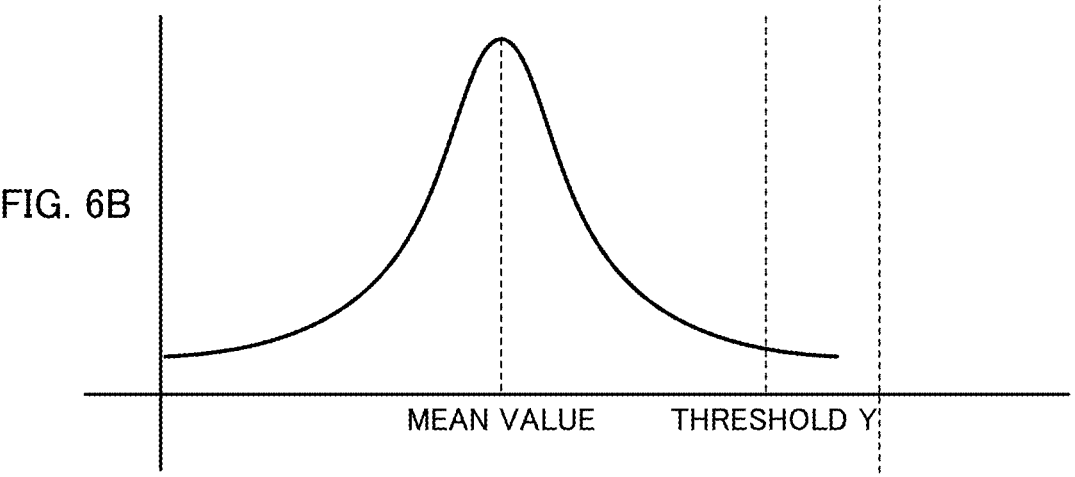
Figure 6C:
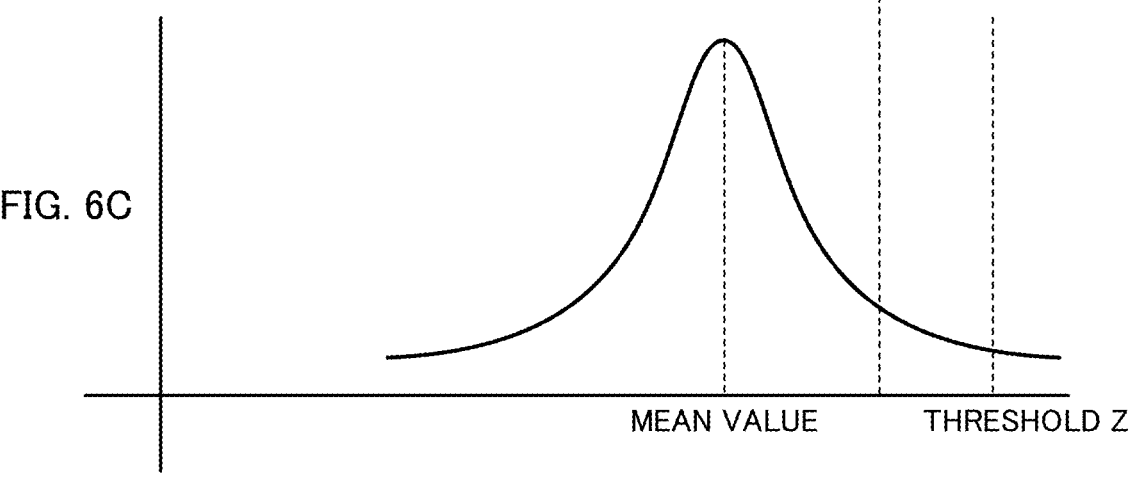

Next, with reference to FIG. 5 and FIG. 6A to FIG. 6C, a technical effect obtained by the threshold calculation system 10 according to the first example embodiment will be described. FIG. 5 is a graph illustrating a relationship between a threshold and a FAR (False Acceptance Rate) and/or a FRR (False Rejection Rate). FIG. 6A to FIG. 6C are graphs illustrating a difference in an ideal threshold due to a difference in a sample distribution.

As illustrated in FIG. 5, as the threshold used for biometric authentication is smaller, the FAR (False Acceptance Rate) is higher. On the other hand, as the threshold used for biometric authentication is larger, the FRR (False Rejection Rate) is higher. Therefore, it is essential to set an appropriate threshold for biometric authentication.

On the other hand, as illustrated in FIG. 6A to FIG. 6C, the threshold calculated by a distribution of the sample data varies. For example, a threshold X is calculated as the ideal threshold from the sample data illustrated in FIG. 6A. On the other hand, a threshold Y is calculated from the sample data illustrated in FIG. 6B. A threshold Z is calculated from the sample data illustrated in FIG. 6C. Therefore, if the sample data used for calculating the threshold are not extracted properly, the calculated threshold may be inappropriate.

According to the threshold calculation system 10 in the example embodiment, however, as illustrated in FIG. 1 to FIG. 4, the sample data for calculating the threshold are extracted on the basis of a population condition about the attribute information. In other words, appropriate sample data are extracted in view of the attribute information. The use of the appropriate sample data makes it possible to properly estimate the population. Properly estimating the population means that it is also possible to properly estimate a distribution of a population including unknown others that are not stored. Consequently, it is possible to calculate an appropriate threshold that assumes the unknown others, from the distribution of the estimated population.

Second Example Embodiment

The threshold calculation system 10 according to a second example embodiment will be described with reference to FIG. 7 and FIG. 8. The second example embodiment is partially different from the first example embodiment described above only in the configuration and operation, and may be the same as the first example embodiment, for example, in the hardware configuration (see FIG. 1). For this reason, a description of the parts that overlap with the first example embodiment will be omitted in the following description, as appropriate.
(Functional Configuration)

First, with reference to FIG. 7, a functional configuration of the threshold calculation system 10 according to the second example embodiment will be described. FIG. 7 is a block diagram illustrating the functional configuration of the threshold calculation system according to the second example embodiment. In FIG. 7, the same components as those illustrated in FIG. 2 carry the same reference numerals.

Figure 7:
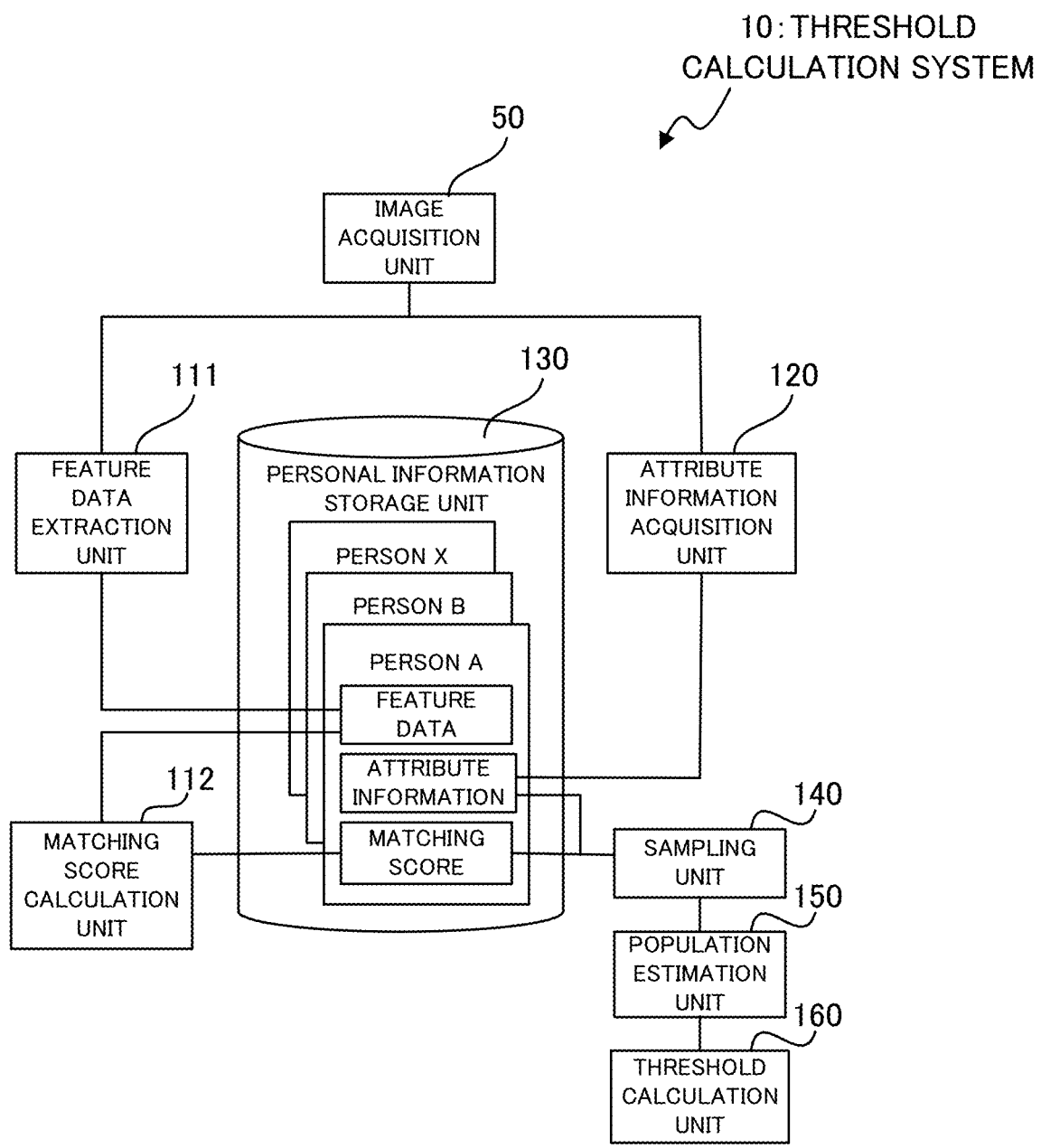
FIG. 7 is a block diagram illustrating a functional configuration of a threshold calculation system according to a second example embodiment.

As illustrated in FIG. 7, the threshold calculation system 10 according to the second example embodiment includes an image acquisition unit 50, a feature data extraction unit 111, a matching score calculation unit 112, the attribute information acquisition unit 120, the personal information storage unit 130, the sampling unit 140, the population estimation unit 150, and the threshold calculation unit 160. That is, the threshold calculation system 10 according to the second example embodiment further includes an image acquisition unit 50 in addition to the configuration in the first example embodiment (see FIG. 2). The threshold calculation system 10 according to the second example embodiment includes a feature data extraction unit 111 and a matching score calculation unit 112, in place of the matching information acquisition unit 110 according to the first example embodiment. Each of the image acquisition unit 50, the feature data extraction unit 111, and the matching score calculation unit 112 may be realized or implemented by the processor 11 (see FIG. 1).

The image acquisition unit 50 is configured to obtain an image including a biological body, for example, from a camera or the like. The image acquisition unit 50 obtains, as the image including the biological body, for example, a face image, an iris image, a fingerprint image, and the like. Image data obtained by the image acquisition unit 50 is configured to be outputted to the feature data extraction unit 111 and the attribute information acquisition unit 120.

The feature data extraction unit 111 is configured to extract a feature data of the biological body may be extracted from the image obtained by the image acquisition unit 50. A detailed description of a method of extracting the feature data will be omitted here, because the existing technologies/ techniques can be adopted to the method, as appropriate. The feature data extracted by the feature data extraction unit 111 is stored in the personal information storage unit 130.

The attribute data acquisition unit 120 according to the second example embodiment determines and obtains the attribute from the image obtained by the image acquisition unit 50. The attribute information acquisition unit 120, however, may obtain the attribute information from other than the image. For example, the attribute information acquisition unit 120 may obtain qualitative and qualitative information that is explicitly inputted as personal data about a biological body, as the attribute information.

The matching score calculation unit 112 is configured to calculate a matching score by using the feature data stored in the personal information storage unit 130 (in other words, the feature data extracted by the feature data extraction unit 111). The matching score here is a score indicating a similarity degree (or a coincidence degree) between a feature data of a newly registered biological body and the feature quantities of the already registered living bodies, and is calculated by comparing the feature data of one person who is the newly registered biological body with the feature quantities of the n people who are already registered. The matching score calculated by the matching score calculation unit 112 is configured to be stored in the personal data storage unit 130 for each biological body. That is, the matching score is stored in the personal information storage unit 130 in such a condition that it is associated with the already stored feature quantities and attribute informations.

(Registration Operation)

Next, with reference to FIG. 8, a flow of an operation of registration of the personal information by the threshold calculation system 10 according to the second example embodiment will be described. FIG. 8 is a flowchart illustrating the flow of the registration operation in the threshold calculation system according to the second example embodiment. In FIG. 8, the same steps as those illustrated in FIG. 3 carry the same reference numerals.

Figure 8:
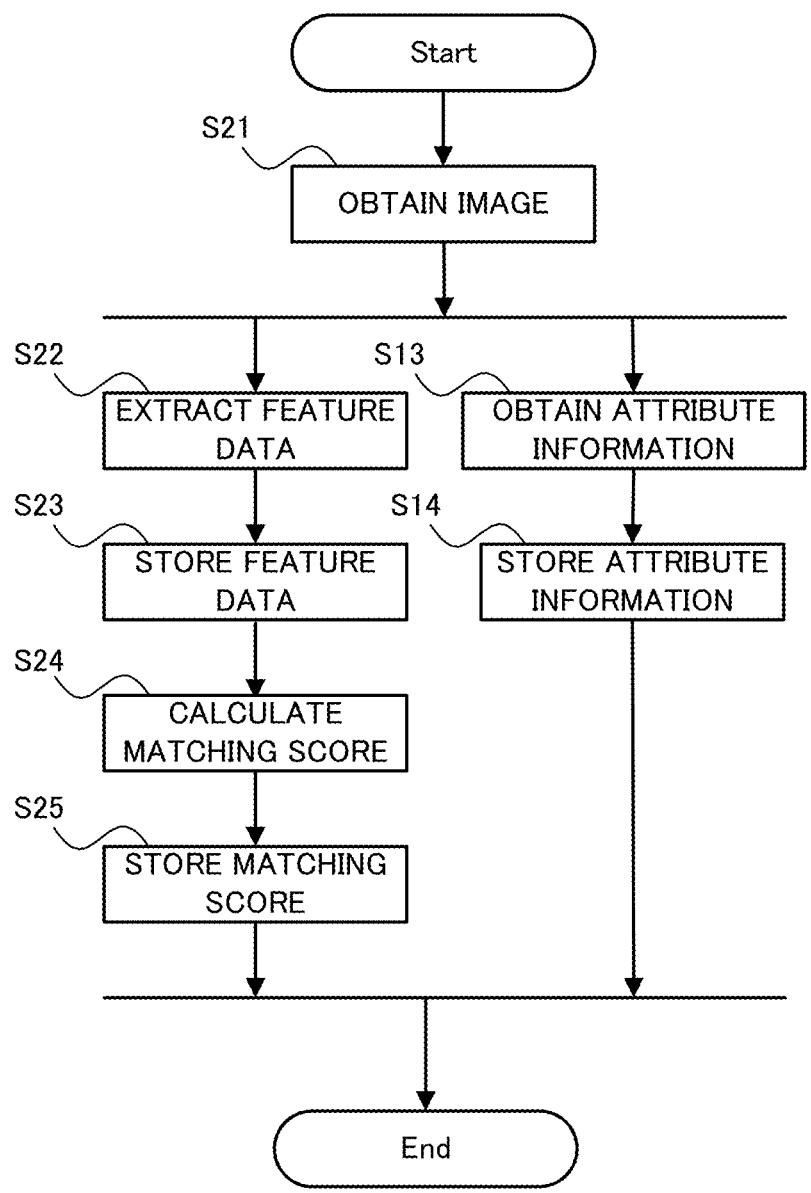
FIG. 8 is a flowchart illustrating a flow of the registration operation in the threshold calculation system according to the second example embodiment.

As illustrated in FIG. 8, in the registration operation of the threshold calculation system 10 according to the second example embodiment, first, the image acquisition unit 50 obtains the image including the biological body (step S21). The image acquisition unit 50 may perform various processing on the image data. (e.g., imaging processing for facilitating the acquisition of the feature data and the attribute information, etc.).

Subsequently, the feature data extraction unit 111 extracts the feature data of the biological body from the image data (step S22). Then, the feature data extraction unit 111 stores the extracted feature data in the personal information storage unit 130 (step S23). Then, the matching score calculation unit 112 calculates the matching score from the feature data (step S24). Then, the matching score calculation unit 112 stores the calculated matching score in the personal information storage unit 130 (step S25).

In parallel with the step S22 to S25, the attribute information acquisition unit 120 obtains the attribute information indicating the attribute of the biological body or the attribute of the matching information (the step S13). The attribute information acquisition unit 130 stores the obtained attribute information in the personal information storage unit 130 (the step S14).

Consequently, in the threshold calculation system 10 according to the second example embodiment, the matching score is stored in the personal information storage unit 130 as the matching information. The matching score may be stored together with the attribute information about the biological body used to calculate the matching score. For example, the matching score calculated in comparison with a person A may be stored in a set with the attribute information about the person A. In this case, when the matching score is calculated in comparison with N people (N is a natural number), N sets (i.e., sets of the matching score and the attribute information) may be stored. Since the matching score can be calculated from the feature data, the personal information storage unit 130 may store the feature data as the matching information. In this case, the matching score may not be stored in the personal information storage unit 130.

(Threshold Calculation Operation)

Next, a flow of a threshold calculation operation by the threshold calculation system 10 according to the second example embodiment will be described. The threshold calculation operation according to the second example embodiment includes the same flow as that of the threshold calculation operation according to the first example embodiment (see FIG. 4). Therefore, a new drawing will be omitted, and a description will be made with reference to FIG. 4 as appropriate.

In the threshold calculation operation of the threshold calculation system 10 according to the second example embodiment, the sampling unit 140 extracts the matching score stored in the personal information storage unit 130, as the sample data, with reference to the corresponding attribute information, on the basis of the population condition (the step S101). When the matching score is not stored in the personal information storage unit 130 (e.g., when the feature data is stored as the matching information), the feature score may be calculated at this stage. Subsequently, the population estimation unit 150 estimates the population by using the extracted sample data (the step S102). Subsequently, the threshold calculation unit 160 calculates the threshold from the distribution of the estimated population (the step S103). The threshold calculation unit 160 calculates the threshold for each biological body.

Then, the threshold calculation system 10 according to the second example embodiment determines whether or not the threshold is calculated for all of the registered people (i.e., all of the living bodies stored in the personal data storage unit) (the step S104). Then, when it is determined that the threshold is not calculated for all of the registered people (the step S104: NO), the threshold calculation system 10 repeats the processing steps from the step S101. On the other hand, when it is determined that the threshold is calculated for all of the registered people (the step S104: YES), the threshold calculation system 10 ends the series of processing steps.

(Technical Effect)

Next, a technical effect obtained by the threshold calculation system 10 according to the second example embodiment will be described.

As described in FIG. 7 and FIG. 8, in the threshold calculation system 10 according to the second example embodiment, the feature data is extracted from the image of the biological body, and the matching score is calculated by using the feature data. Therefore, it is possible to easily obtain and store the matching data used for biometric authentication. Furthermore, since the attribute information can be determined and obtained from the image of the biological body, it is possible to properly obtain the attribute information even when the attribute information is not directly inputted.

Modified Example

Next, the threshold calculation system 10 according to a modified example of the second example embodiment will be described with reference to FIG. 9 and FIG. 10. In the modified example described below, a biometric authentication operation is performed by using the threshold calculated in the second example embodiment described above.

(Functional Configuration)

First, with reference to FIG. 9, a functional configuration of the threshold calculation system 10 according to the modified example of the second example embodiment will be described. FIG. 9 is a block diagram illustrating the functional configuration of the threshold calculation system according to the modified example of the second example embodiment. In FIG. 9, the same components as those illustrated in FIG. 7 carry the same reference numerals.

Figure 9:
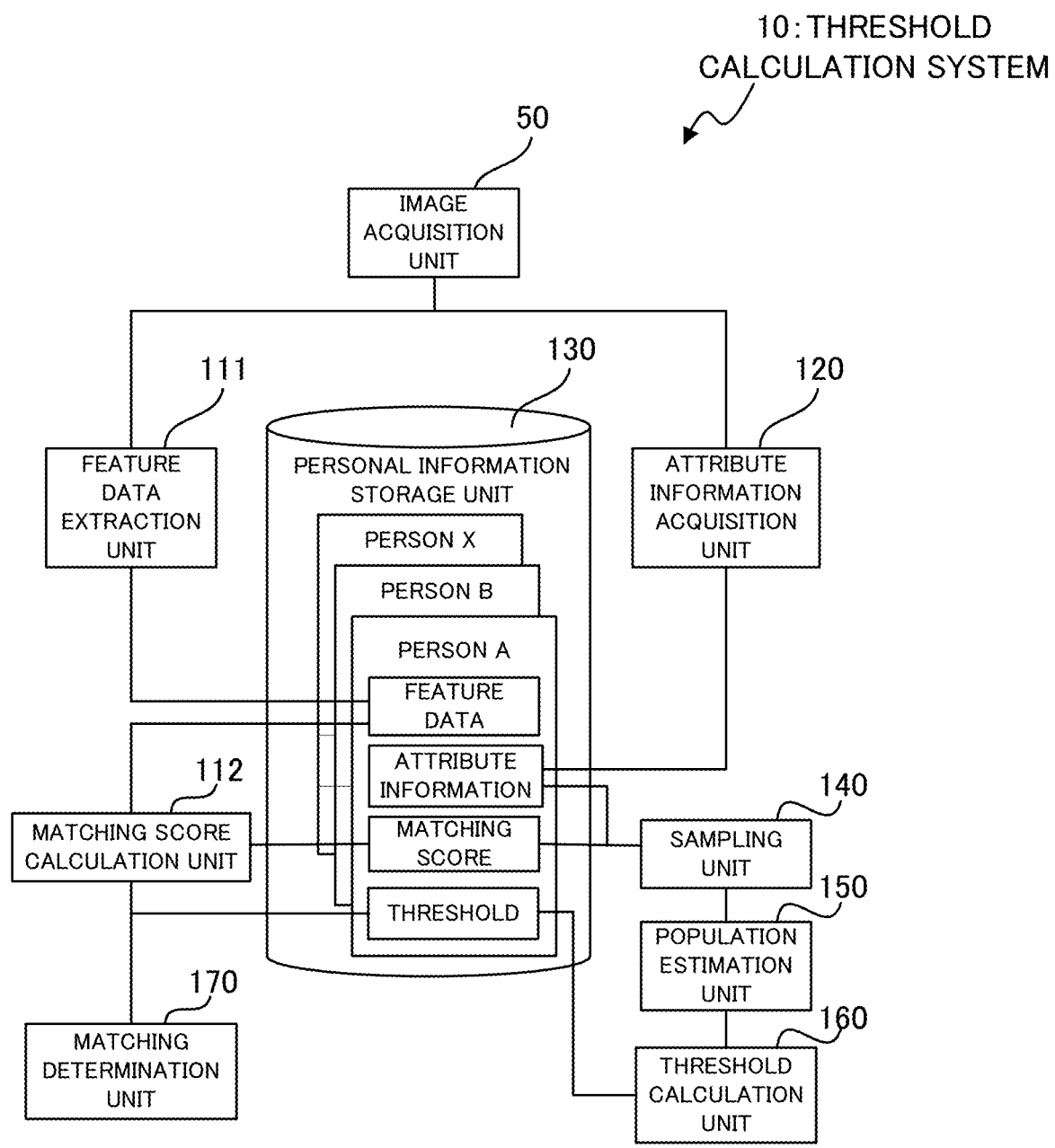
FIG. 9 is a block diagram illustrating a functional configuration of a threshold calculation system according to a modified example of the second example embodiment.

As illustrated in FIG. 9, the threshold calculation system 10 according to the modified example of the second example embodiment includes the image acquisition unit 50, the feature data extraction unit 111, a matching score calculation unit 112, attribute information acquisition unit 120, the personal information storage unit 130, the sampling unit 140, the population estimation unit 150, the threshold calculation unit 160, and a matching determination unit 170. That is, the threshold calculation system 10 according to the modified example of the second example embodiment further includes a matching determination unit 170 in addition to the configuration in the second example embodiment (see FIG. 7). The matching determination unit 170 may be realized or implemented by the processor 11 (see FIG. 1).

Furthermore, the personal information storage unit 130 according to the modified example is configured to store the threshold calculated by the threshold calculation unit 160 for each biological body. That is, the threshold calculated by the threshold calculation unit 160 is stored in the personal information storage unit 130 in such a condition that it is associated with the feature data, the attribute information, and the matching score that are already stored.

(Authentication Operation)

Next, with reference to FIG. 10, an authentication operation by the threshold calculation system 10 according to the modified example of the second example embodiment will be described. FIG. 10 is a flow chart illustrating a flow of the authentication operation of the threshold calculation system according to the modified example of the second example embodiment. In FIG. 10, the same steps as those illustrated in FIG. 8 carry the same reference numerals.

Figure 10:
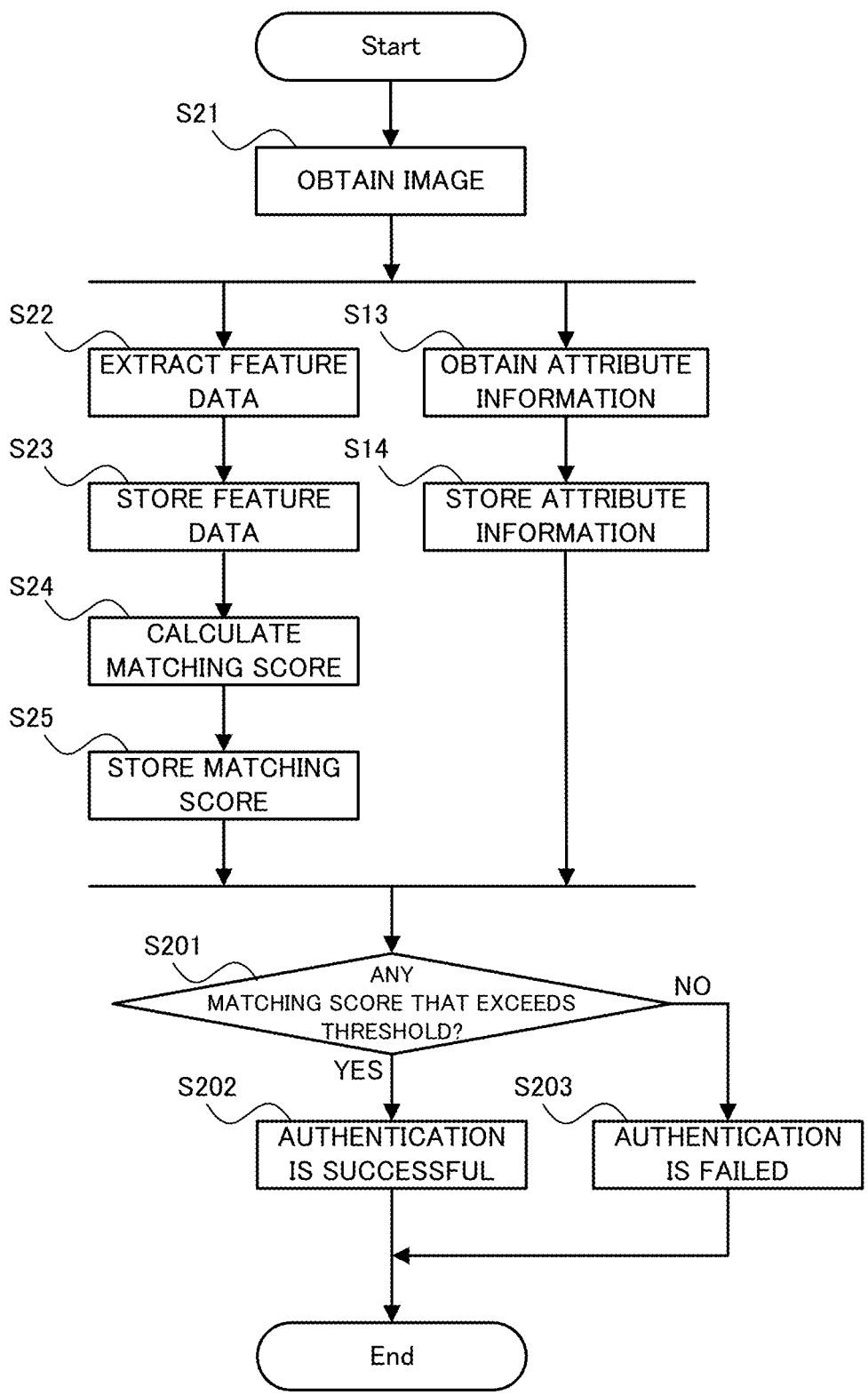
FIG. 10 is a flow chart illustrating a flow of an authentication operation by the threshold calculation system according to the modified example of the second example embodiment.

As illustrated in FIG. 10, in the threshold calculation system 10 according to the modified example of the second example embodiment, first, the image acquisition unit 50 obtains the image including the biological body that is an authentication target (the step S21).

Subsequently, the feature data extraction unit 111 extracts the feature data of the biological body from the image data (the step S22). Then, the feature data extraction unit 111 stores the extracted feature data in the personal information storage unit 130 (the step S23). Then, the matching score calculation unit 112 calculates the matching score from the feature data (step S24). Then, the matching score calculation unit 112 stores the calculated matching score in the personal information storage unit 130 (the step S25).

In parallel with the steps S22 to S25, the attribute information acquisition unit 120 obtains the attribute information indicating the attribute of the biological body or the attribute of the matching information (the step S13). The attribute information acquisition unit 130 stores the obtained attribute information in the personal information storage unit 130 (the step S14). When the attribute information is not used during authentication, the attribute information may not be necessarily obtained in parallel. For example, depending on a processing load of the system, the attribute information may be obtained after the completion of the authentication operation.

Subsequently, the matching determination unit 170 compares the matching score with the threshold and determines whether or not there is a matching score that exceeds the threshold (step S201). Then, when there is a matching score that exceeds the threshold (the step S201: YES), the matching determination unit 170 determines that the biometric authentication is successful (i.e., the biological body that is an authentication target matches a biological body corresponding to the matching score that exceeds the threshold) (step S202). In this case, the matching determination unit 170 may output an instruction to perform a process associated with the success of the biometric authentication. For example, the matching determination unit 170 may give an instruction to perform a process of opening a gate through which a target person for whom the biometric authentication is succeeded tries to pass (i.e., a process of allowing the target person to go through the gate).

When the matching score of the authentication target exceeds the threshold for the plurality of living bodies registered, it may be determined that the biological body that is an authentication target matches a biological body with the higher matching score. Since it is not preferable to have more than one biological body with the matching score that exceeds the threshold, a process of estimating the population and resetting the threshold (e.g., changing the threshold to be higher) may be performed when more than one biological body with the matching score that exceeds the threshold is detected. In addition, when the threshold is set for each registered biological body, a degree of deviation between the matching score and the threshold (i.e., how much the matching score exceeds the threshold) may be considered.

When the biometric authentication is successful, a part or all of the information (i.e., the feature data, the attribute information, and the matching score) already stored in the personal information storage unit 130 may be rewritten to the newly obtained data, in accordance with the quality of the data.

On the other hand, when there is no matching score that exceeds the threshold (the step S201: NO), the matching determination unit 170 determines that biometric authentication is failed (i.e., the biological body that is an authentication target does not match any of the registered living bodies) (step S203). In this case, the matching determination unit 170 may output an instruction to perform a process associated with the failure of the biometric authentication. For example, the matching determination unit 170 may give an instruction to perform a process of closing a gate through which a target person for whom the biometric authentication is failed tries to pass (i.e., a process of not allowing the target person to go through the gate).

The threshold used in the authentication operation described above is calculated in advance by the threshold calculation operation described in FIG. 4. Thus, it is not necessary to calculate the threshold after authentication operation starts, and it is consequently possible to control or reduce an increasing processing load in the authentication operation.

Third Example Embodiment

Figure 11:
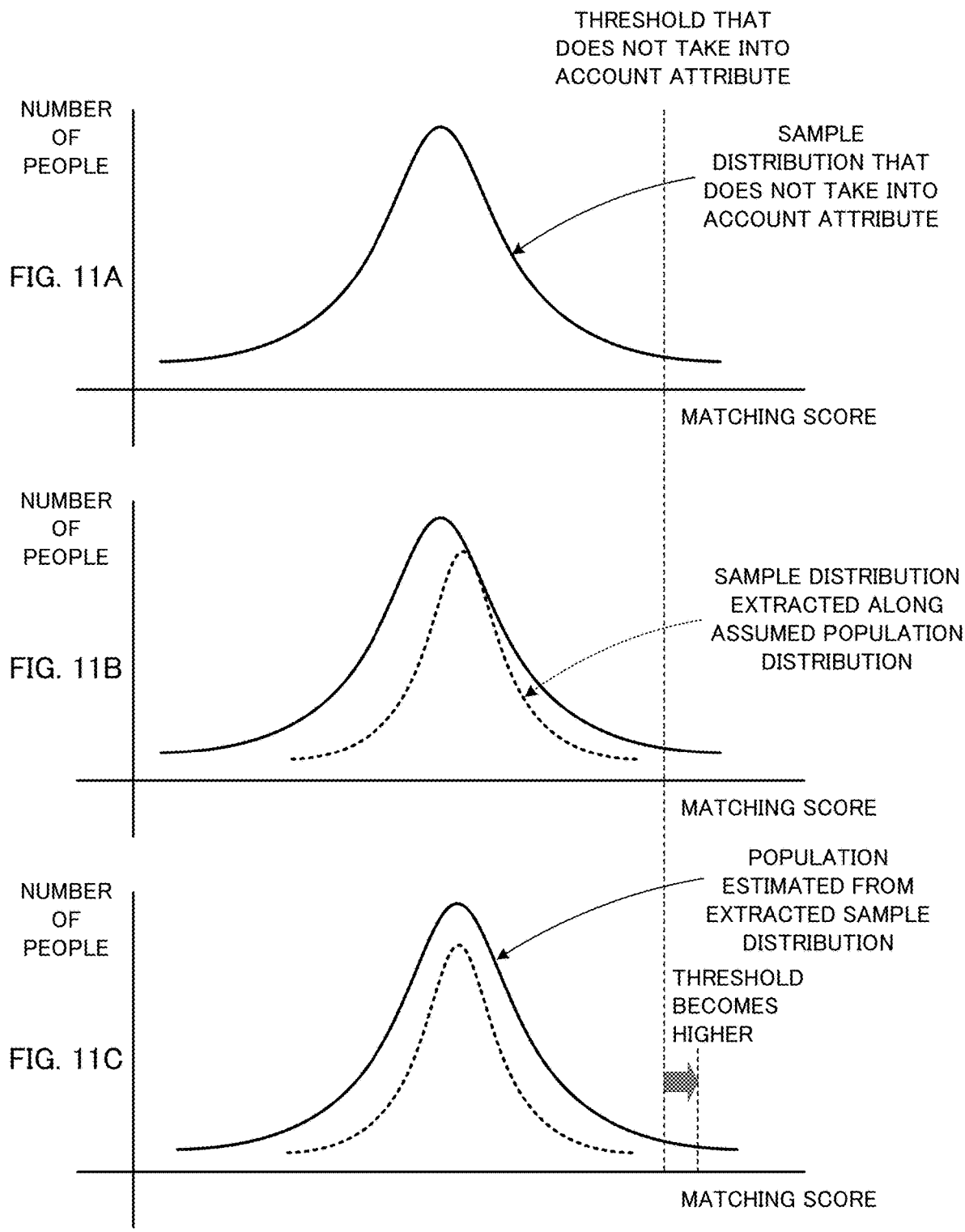
FIG. 11A to FIG. 11C are graphs illustrating threshold variation in the case of sampling along an assumed population distribution.

The threshold calculation system 10 according to a third example embodiment will be described with reference to FIG. 11. The third example embodiment describes a specific example about the attribute information, and may be the same as the first and second example embodiments in the configuration and operation of the system (refer to FIG. 1 to FIG. 10). For this reason, a description of the parts that overlap with the first and second example embodiments will be omitted in the following description, as appropriate.

(Personal Attribute Information)

First, a personal attribute information used in the threshold calculation system 10 according to the third example embodiment will be described.

The threshold calculation system 10 according to the third example embodiment may use the personal attribute information indicating a personal attribute of a biological body, as the attribute information. Examples of the personal attribute information include a race, age, gender, skin color, and the like. The threshold calculation system 10 according to the third example embodiment may use a combination of a plurality of personal attribute informations. By using the personal attribute information, it is possible to calculate an appropriate threshold from a distribution of the population that takes into account the attribute of each person included in the population that is assumed in system operation.
(Condition about Personal Attribute Information)

Subsequently, with reference to FIG. 11A to FIG. 11C, a population condition about the personal attribute information will be described. FIG. 11A to FIG. 11C are graphs illustrating threshold variation in the case of sampling along an assumed distribution of the population.

When the personal attribute information is used, the population condition may be set as a condition corresponding to a ratio in the population assumed in system operation. For example, if it is assumed that men and women who are authentication targets of the system have approximately equal ratios, a population condition of "50% men and 50% women" may be set. In this case, when the living bodies registered in the personal information storage unit 130 are biased to men, the sample extraction unit 140 may extract the sample data that match the population condition, while the extraction for men is performed on only a part of elements. Alternatively, the sample extraction unit 140 may extract the sample data that match the population condition, while elements for women are weighted and extracted as a plurality of elements. In addition, when weighting is performed while there are few sample data of the relevant attributes, the population is estimated by using only the sample data of the relevant attributes in consideration of the bias of the same sample data, and a result of the estimation may be extracted as a plurality of elements. That is, instead of using a small number of data elements as a plurality of elements as it is, the estimation of the population described above may be applied to supplement insufficient data. More specifically, when three samples (average matching score 0.4) are used as data for 10 people, handling may be as follows in accordance with the distribution of the population: for example, a person with a matching score of 0.30, two people with a matching score of 0.35, four people with a matching score of 0.40, two people with a matching score of 0.45, two people with a matching score 0.45, and a person with a matching score 0.50.

As illustrated in FIG. 11A to FIG. 11C, when the sample data are extracted along the assumed population distribution, calculated is the threshold that is different from the threshold calculated without consideration of the attribute. For example, suppose that a sample distribution illustrated in FIG. 11A is extracted without consideration of the attribute. Also suppose that a sample distribution illustrated by a dashed line in FIG. 11B is extracted in consideration of the assumed population distribution. In this case, a population distribution as illustrated in FIG. 11C is obtained from the sample distribution that takes into account the assumed population distribution (i.e., obtained is a distribution that is different from the sample distribution that does not take into account attributes). Therefore, in this case, the calculated threshold becomes higher than the threshold that does not take into account the attribute.

As described above, if the condition about a ratio of the attribute is set as the population condition, it is possible to calculate a more appropriate threshold in consideration of the ratio of each attribute in the population.

In addition, a day of the week or a time zone may be used as the population condition. In combination of the condition about the ratio of the attribute described above and the condition about the day of the week, for example, a different ratio may be set for each day of the week as the population condition, such as a male-female ratio of 40:60 for Monday, and a male-female ratio of 60:40 for Saturday. In addition, in combination of the condition about the ratio of the attribute described above and the condition about the time zone, for example, a different ratio may be set for each time zone as the population condition, such as a male-female ratio of 40:60 for 10:00 to 12:00, and a male-female ratio of 60:40 for 12:00 to 14:00. The population condition may be set by combining the time zone and the day of the week. By using the day of the week and time zone as the population condition, it is possible to set an appropriate population condition in accordance with actual operation.

Fourth Example Embodiment

The threshold calculation system 10 according to a fourth example embodiment will be described with reference to FIG. 12A to FIG. 12C. The fourth example embodiment describes a specific example about the attribute information as in the third example embodiment, and may be the same as the first and second example embodiments in the configuration and operation of the system (refer to FIG. 1 to FIG. 10). For this reason, the parts that overlap with the first and second example embodiments will be omitted, as appropriate.
(Environmental Attribute Information)

First, an environmental attribute information used in the threshold calculation system 10 according to the fourth example embodiment will be described.

The threshold calculation system 10 according to the fourth example embodiment may use the environment attribute information that indicates an environment in which the matching information is obtained, as the attribute information. An example of the environmental attribute information includes an environment in which an image of a biological body is captured (e.g., how the biological body appears in the image, camera specifications, an imaging parameter information, light source presence or intensity, background type, image quality, color tone, pixel brightness, etc.). The threshold calculation system 10 according to the fourth example embodiment may use a combination of a plurality of environmental attribute informations. Since the use of the environmental attribute information allows the extraction of only the sample data obtained in an appropriate environment, it is possible to eliminate an influence of data obtained in an inappropriate environment and to calculate an appropriate threshold.
(Condition about Environmental Attribute Information)

Next, with reference to FIG. 12A to FIG. 12C, a population condition about the environmental attribute information will be described. FIG. 12A to FIG. 12C are graphs illustrating threshold variation in the case of sampling by eliminating an influence of a difference in pixel brightness.

When the environment attribute information is used, the population condition may be set to extract only such data that their similarity degrees are close with respect to the environment in which the image of the biological body is captured. In other words, data with significantly different environments in which the image of the biological body is captured may be excluded from an extraction target. In addition, data obtained from samples that have extremely bad indexes of the captured environment or image quality may be excluded from the extracted target. In other words, such data that the environmental attribute information (e.g., an imaging parameter, an environmental parameter, resolution, etc.) is less than a certain level may be excluded from the extraction target.

Figure 12:
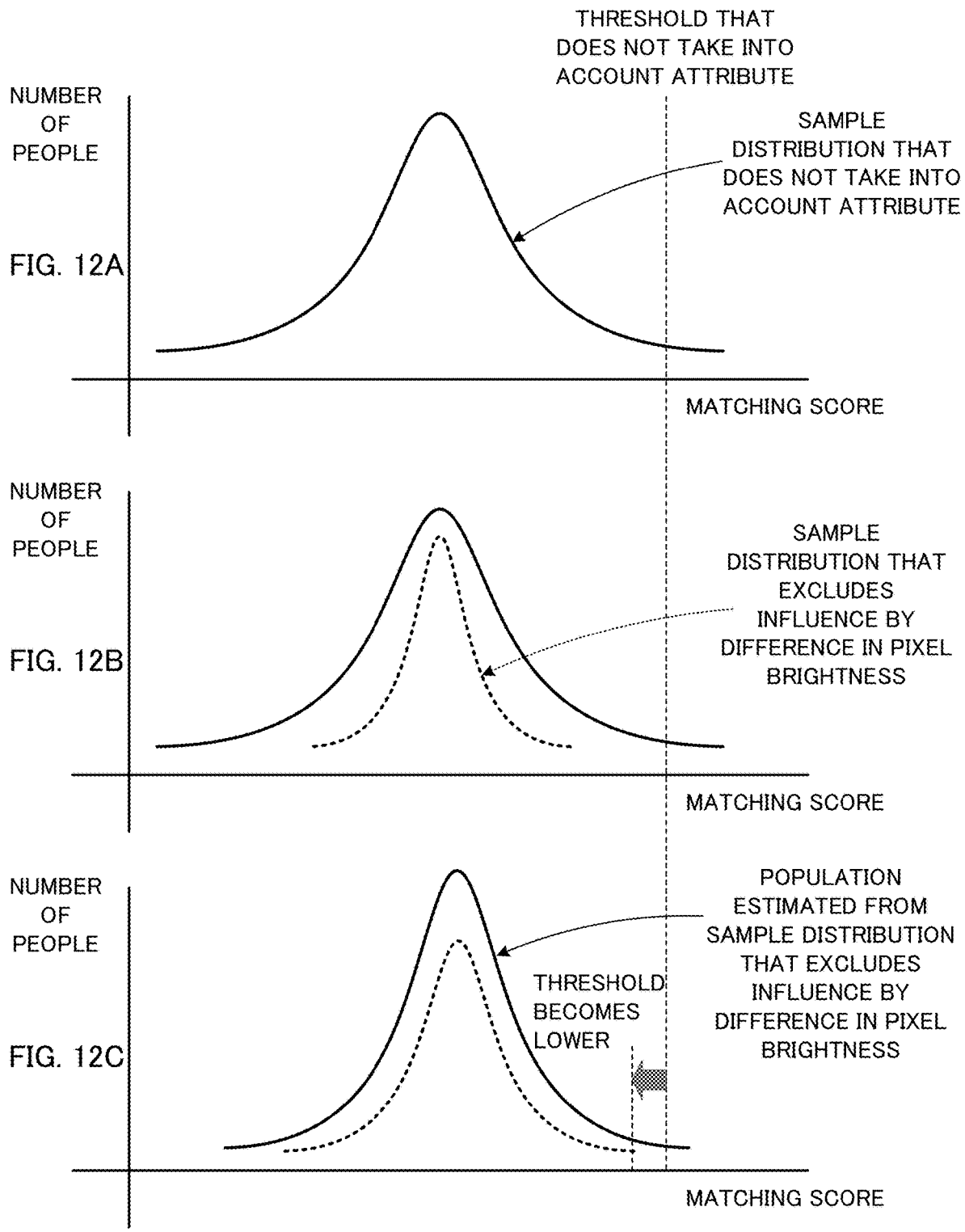
FIG. 12A to FIG. 12C are graphs illustrating threshold variation in the case of sampling by eliminating an influence of a difference in pixel brightness.

As illustrated in FIG. 12A to FIG. 12C, when the sample data with a large difference in pixel brightness are excluded from the extraction target, calculated is the threshold that is different from the threshold calculated without consideration of the attribute. For example, suppose that a sample distribution illustrated in FIG. 12A is extracted without consideration of the attribute. Also suppose that a sample distribution as illustrated by a dashed line in FIG. 12B is extracted by eliminating the data that have a big difference in pixel brightness. In this case, a population distribution as illustrated in FIG. 12C is obtained from the assumed sample distribution that excludes the data that have a big difference in pixel brightness (i.e., obtained is a distribution that is different from the sample distribution that does not take into account the attribute). Therefore, in this case, the calculated threshold becomes lower than the threshold that does not take into account the attribute.

As described above, by setting the similarity degree of the environmental attribute information and the level of environmental attribute information as the population condition, it is possible to eliminate an inappropriate influence on the matching information and to calculate a more appropriate threshold.

In addition, as in the third example embodiment described above, the day of the week or the time zone may be used as the population condition. For example, when an image of a biological body is obtained with a camera, it is possible to set such a condition that the camera is exposed to direct sunlight in the morning, but not in the afternoon due to the arrangement (i.e., the condition about the time zone). Furthermore, when a shape of the population distribution is stored as a history and the same distribution is calculated in a particular time zone or day of the week, the subsequent threshold update may be stopped in the particular time zone or day of the week, or the frequency of the threshold update may be reduced.

Fifth Example Embodiment

The threshold calculation system 10 according to a fifth example embodiment will be described with reference to FIG. 13 and FIG. 14. The fifth example embodiment is partially different from the first to fourth example embodiments in the configuration and operation, and may be the same as the first to fourth example embodiments in the hardware configuration and the above-described operations (the registration operation, the threshold calculation operation, and the authentication operation). Therefore, the parts that overlap with the first to fourth example embodiments will be omitted in the following description, as appropriate.
(Functional Configuration)

Figure 13:
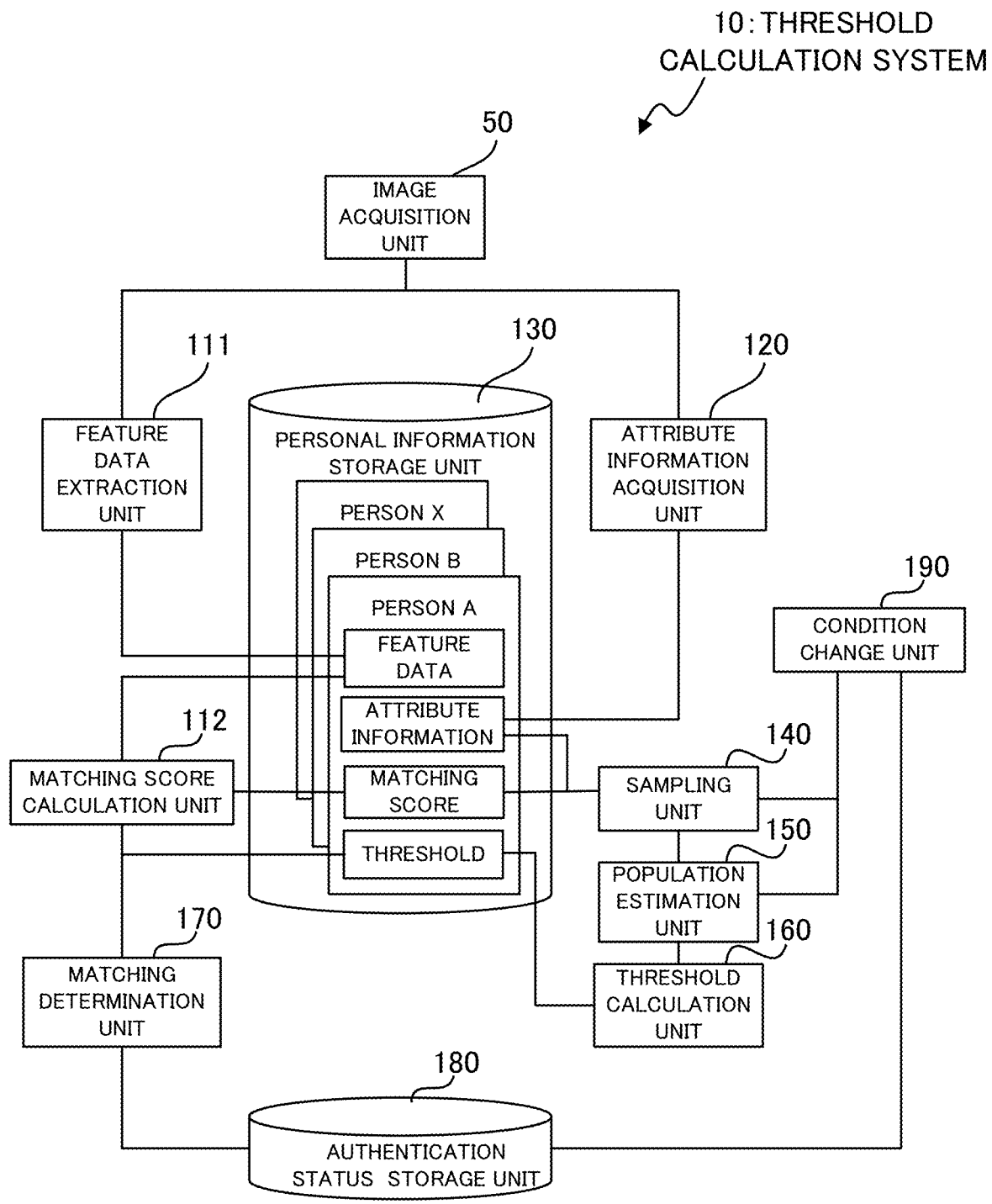
FIG. 13 is a block diagram illustrating a functional configuration of a threshold calculation system according to a fifth example embodiment.

As illustrated in FIG. 13, the threshold calculation system 10 according to the fifth example embodiment includes the image acquisition unit 50, the feature data extraction unit 111, the matching score calculation unit 112, attribute information acquisition unit 120, the personal information storage unit 130, the sampling unit 140, the population estimation unit 150, the threshold calculation unit 160, the matching determination unit 170, an authentication status storage unit 180, and a condition change unit 190. That is, the threshold calculation system 10 according to the fifth example embodiment further includes an authentication status storage unit 180 and a condition change unit 190 in addition to the configuration in the modified example of the second example embodiment (see FIG. 9). The authentication status storage unit 180 may be realized or implemented by the storage apparatus 14 (see FIG. 1). The condition change unit 190 may be realized or implemented by the processor 11 (see FIG. 1).

The authentication status storage unit 180 is configured to store an authentication result of the matching determination unit 170. The authentication status storage unit 180 stores, for example, the number of registered living bodies, the number of living bodies that are determined to be unregistered, and the ratio of each attribute information. Various informations stored in the authentication status storage unit 180 are readable by the condition change unit 190, as appropriate.

The condition change unit 190 is configured to change the population condition, on condition that the information is sufficiently accumulated in the authentication status storage unit 180. The condition change unit 190 sets the population condition that is suitable for an actual operation status of the system, for example, by feeding-back the information stored in authentication status storage unit 180. For example, when it can be determined from the information accumulated in the authentication status storage unit 180 that the ratio in the population is changed, the condition change unit 190 changes the population condition to a population condition corresponding to a ratio after the change.
(Condition Change Operation)

Next, with reference to FIG. 14, a condition change operation by the threshold calculation system 10 according to the fifth example embodiment will be described. FIG. 14 is a flowchart illustrating a flow of the change operation of changing the population condition by the threshold calculation system according to the fifth example embodiment.

Figure 14:
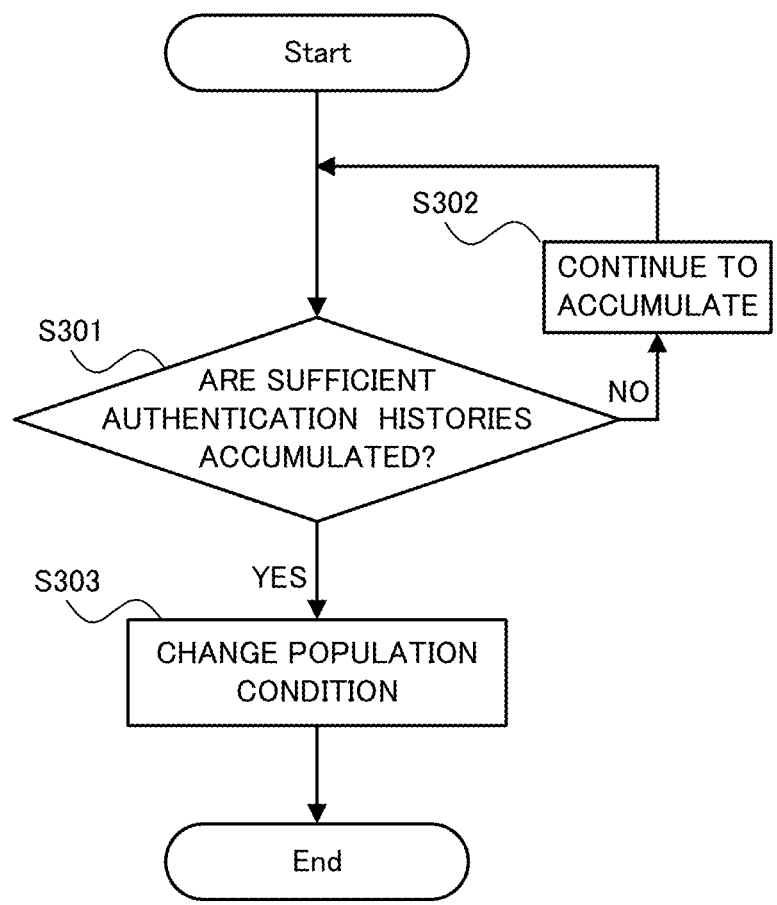
FIG. 14 is a flowchart illustrating a flow of a change operation of changing a population condition by the threshold calculation system according to the fifth example embodiment.

As illustrated in FIG. 14, in the threshold calculation system 10 according to the fifth example embodiment, first, the condition change unit 190 determines whether or not sufficient authentication histories are accumulated in the authentication status storage section 180 (step S301). Specifically, the condition change unit 190 may determine whether or not authentication histories sufficient to estimate the population in actual operation are accumulated.

When it is determined that the sufficient authentication histories are not accumulated (the step S301: NO), the authentication status storage unit 180 continues to accumulate authentication histories without proceeding to the subsequent steps (step S302). On the other hand, when it is determined that the sufficient authentication histories are accumulated (the step S301: YES), the condition change unit 190 changes the population condition in accordance with the accumulated authentication histories (step S303).

The condition change unit 190 may be configured to change the condition, manually (e.g., by an operation by a system manager or the like). For example, when an instruction to immediately change the population condition is inputted, even if sufficient authentication histories are not accumulated, the condition change unit 190 may change the population condition in accordance with the authentication histories. Furthermore, when a specific condition of the population condition is inputted, the condition change unit 190 may adopt the inputted population condition as it is, without using the accumulated authentication histories.
(Technical Effect)

Next, a technical effect obtained by the threshold calculation system 10 according to the fifth example embodiment will be described.

As described with reference to FIG. 13 and FIG. 14, in the threshold calculation system according to the fifth example embodiment, since the population condition is changed as appropriate, the sample data are newly extracted from the changed population condition, and the threshold is updated. Therefore, it is possible to more properly update the threshold, compared to when the population condition is not changed. Specifically, it is possible to realize the threshold update in accordance with the population in actual operation.

Sixth Example Embodiment

The threshold calculation system 10 according to a sixth example embodiment will be described with reference to FIG. 15. The sixth example embodiment describes a specific example of timing at which the threshold calculation operation is performed, and may be the same as the first to fifth example embodiments in the system configuration and other operations. For this reason, a description of the parts that overlap with those already described will be omitted in the following description, as appropriate.
(Threshold Calculation Associated with Condition Change)

First, with reference to FIG. 15, a threshold calculation operation associated with a change in the population condition will be described. FIG. 15 is a flowchart illustrating a flow of the threshold calculation operation in the threshold calculation system according to the sixth example embodiment. In FIG. 15, the same steps as those illustrated in FIG. 4 carry the same reference numerals. Furthermore, in the example illustrated in FIG. 15, it is assumed that the threshold calculation system 10 includes the condition change unit 190 as in the fourth example embodiment.

Figure 15:
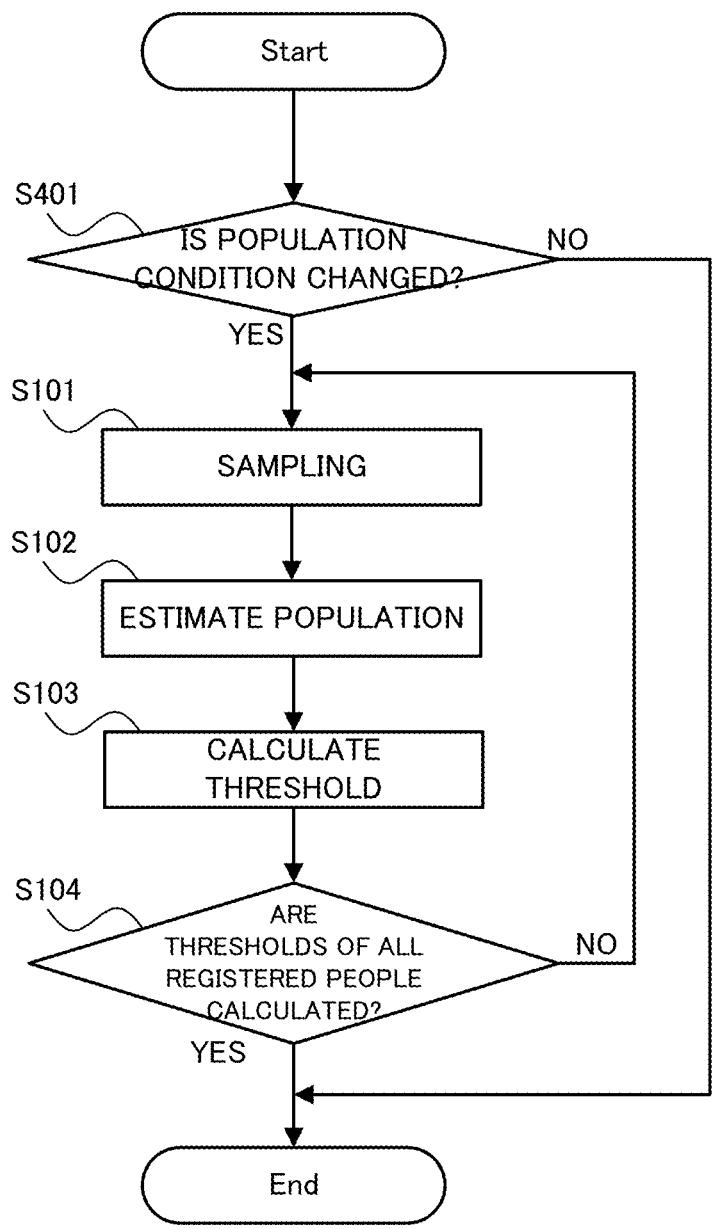
FIG. 15 is a flowchart illustrating a flow of the threshold calculation operation in a threshold calculation system according to a sixth example embodiment.

As illustrated in FIG. 15, first, the threshold calculation system 10 according to the sixth example embodiment determines whether or not the population condition is changed by the condition change unit 190 (step S401). When it is determined that the population condition is not changed (the S401: NO steps), the subsequent steps are omitted and a series of processing steps is ended.

On the other hand, when it is determined that the population condition is changed (the step S401: YES), the threshold calculation system 10 performs the threshold calculation operation described in FIG. 4 (i.e., the steps S101 to S104). Therefore, the threshold is calculated (updated) at a time when the population condition is changed. In this way, it is possible to update the threshold at an appropriate time in accordance with the change in the population that is to be assumed in actual operation.

Seventh Example Embodiment

The threshold calculation system 10 according to a seventh example embodiment will be described with reference to FIG. 16. The seventh example embodiment describes a specific example of the timing at which the threshold calculation operation is performed, and may be the same as the first to fifth example embodiments in the system configuration and other operations. For this reason, a description of the parts that overlap with those already described will be omitted in the following description, as appropriate.
(Threshold Calculation Associated with Storage of Personal Information)

Figure 16:
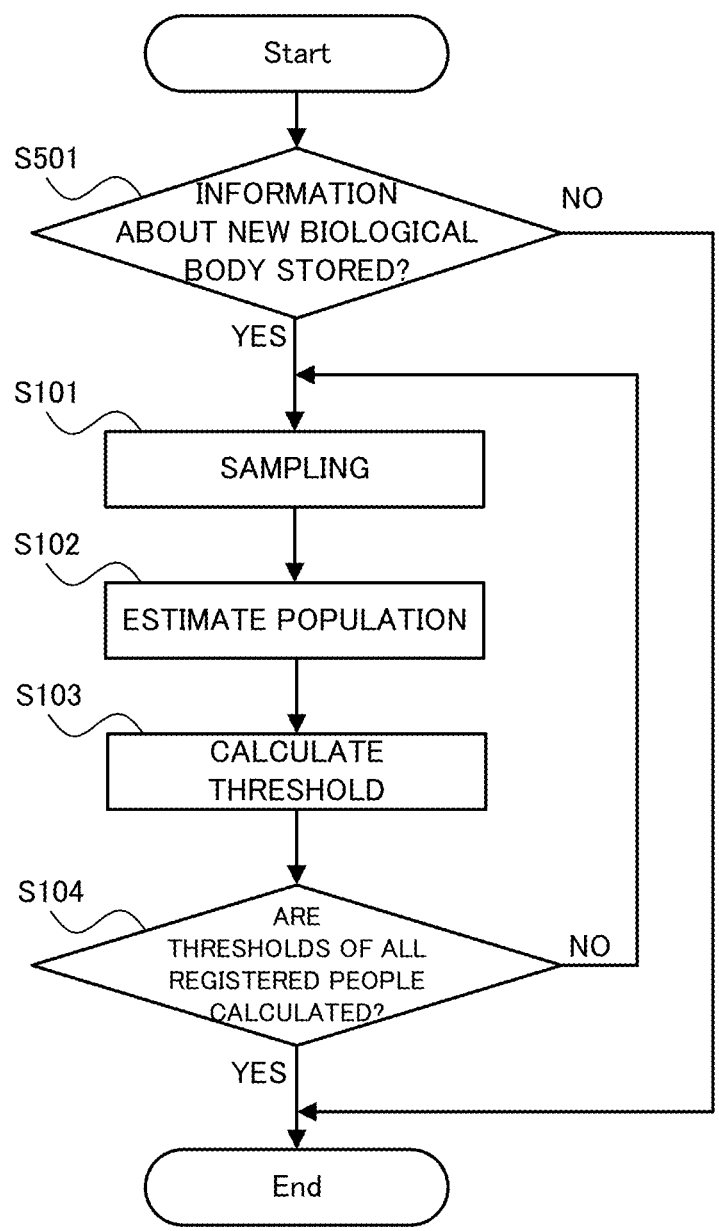
FIG. 16 is a flowchart illustrating a flow of the threshold calculation operation in a threshold calculation system according to a seventh example embodiment.

With reference to FIG. 16, a threshold calculation operation associated with the storage of a new personal information will be described. FIG. 16 is a flowchart illustrating a flow of the threshold calculation operation in the threshold calculation system according to the seventh example embodiment. In FIG. 16, the same steps as those illustrated in FIG. 4 carry the same reference numerals.

As illustrated in FIG. 16, first, the threshold calculation system 10 according to the seventh example embodiment determines whether or not information about a new biological body is stored in the personal information storage unit (step S501). That is, the threshold calculation system 10 determines whether or not the registration operation described in FIG. 3 and FIG. 8 or the like is performed. When it is determined that the information about the new biological body is not stored (the step S501: NO), the subsequent steps are omitted and a series of processing steps is ended.

On the other hand, when it is determined that the information about the new biological body is stored (the step S501: YES), the threshold calculation system 10 performs the threshold calculation operation (i.e., the steps S101 to S104) described in FIG. 4. Therefore, the threshold is calculated (updated) at a time when the information about the new biological body is stored. In this way, it is possible to update the threshold at a time when the element that can be extracted as the sample data increases. In addition, since the threshold is calculated at a stage of registering the information about the biological body, it is possible to control or reduce an increasing processing load when the biometric authentication is performed (i.e., it is not necessary to perform a process of calculating the threshold at the time of matching).

Eighth Example Embodiment

The threshold calculation system 10 according to an eighth example embodiment will be described with reference to FIG. 17 and FIG. 18. The eighth example embodiment is partially different from the first to seventh example embodiments only in the operation (specifically, the operation of registering data about an unregistered person), and may be the same as the above-described example embodiments in the system configuration and other operations. For this reason, the parts that overlap with the first to fifth example embodiments will be omitted, as appropriate.
(Authentication Operation)

First, with reference to FIG. 17, the authentication operation by the threshold calculation system 10 according to the eighth example embodiment will be described. FIG. 17 is a flowchart illustrating a flow of the authentication operation by the threshold calculation system according to the eighth example embodiment. In FIG. 17, the same steps as those illustrated in FIG. 10 carry the same reference numerals.

Figure 17:
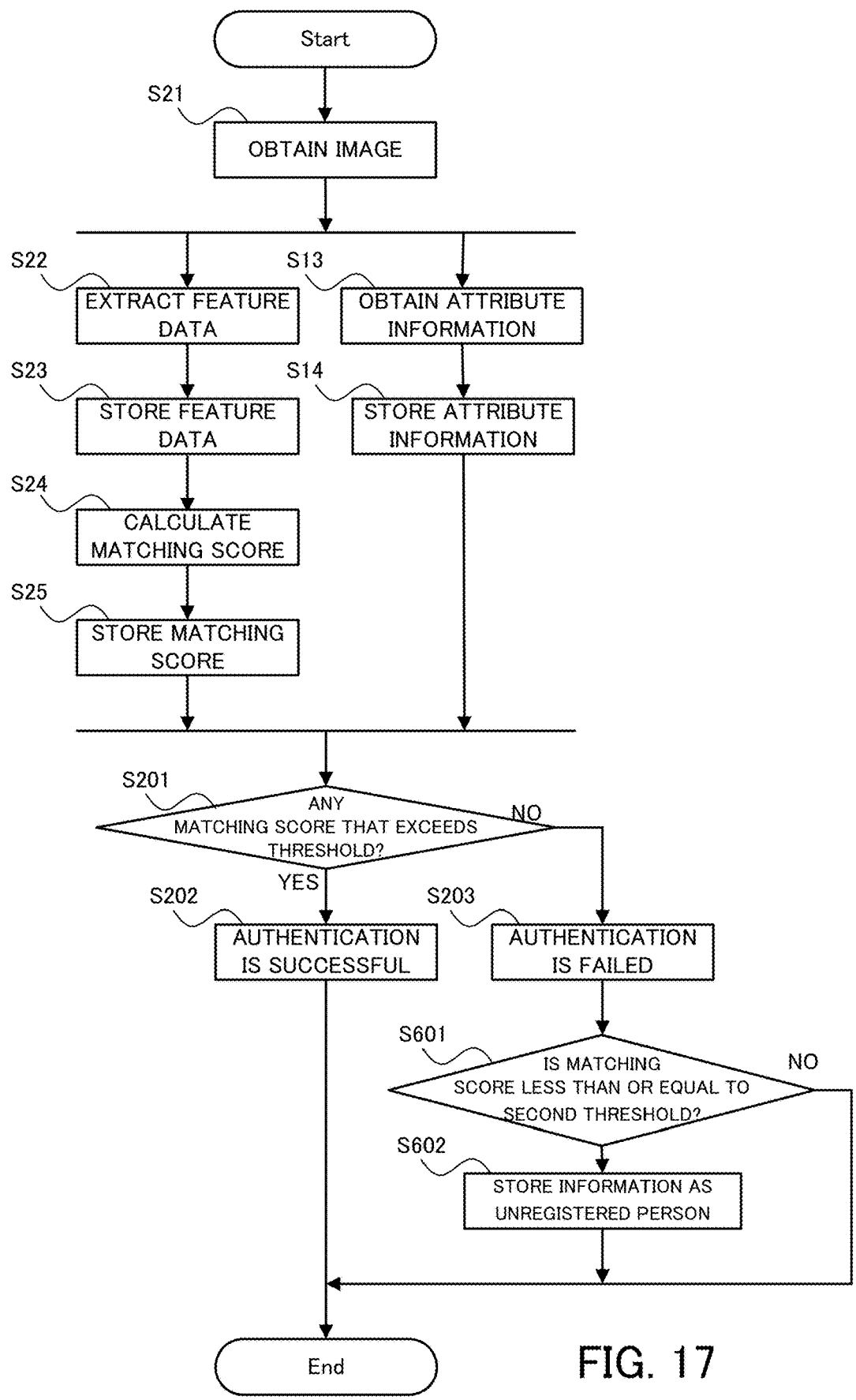
FIG. 17 is a flowchart illustrating a flow of the authentication operation by a threshold calculation system according to an eighth example embodiment.

As illustrated in FIG. 17, the threshold calculation system 10 according to the eighth example embodiment performs the authentication operation described in FIG. 10. That is, the threshold calculation system 10 performs the steps S21 to S25 and the steps S201 to S203 in FIG. 10.

Especially in the eighth example embodiment, when it is determined that the biometric authentication is failed (the step S203), the matching determination unit 170 determines whether or not the matching score of the biological body that is an authentication target is less than or equal to a second threshold (step S601). The "second threshold" here is a threshold for determining whether or not the biological body that is an authentication target is an unregistered person (i.e., a biological body whose data are not stored in the personal information storage unit 130), and is set to be lower than the threshold that is used for the biometric authentication. The second threshold may be, for example, a value of the population mean.

When it is determined that the matching score is less than or equal to the second threshold (the step S601: YES), the matching determination unit 170 determines that the biological body is an unregistered person, and stores the attribute information and the matching score in the personal information storage unit 130. In addition, with consent of an unregistered person, the matching determination unit 170 may store the personal information, such as the feature data, in the personal information storage unit 130. When it is determined that the matching score is not less than or equal to the second threshold (the step S601: YES), the matching determination unit 170 determines that the biological body is not an unregistered person, and does not store the above-described informations.

The determination using the second threshold is merely an example, and other techniques/technologies may be used to determine whether or not the biological body is an unregistered person. For example, when the matching score falls below all the thresholds, it may be determined that the biological body is an unregistered person. That is, in the above-described example, a determination process using the second threshold is performed when the matching score falls below all the thresholds. When the matching score falls below all the thresholds, however, it may be determined that the biological body is an unregistered person, with the determination process using the second threshold omitted.

(UI Display Example)

Next, with reference to FIG. 18, a description will be given to a display example of a UI (User Interface) when data about an unregistered person are stored. FIG. 18 is a diagram illustrating the display example of the UI when the data about the unregistered person are stored. The UI may be realized or implemented by the output apparatus 16 described above (see FIG. 1).

Figure 18:
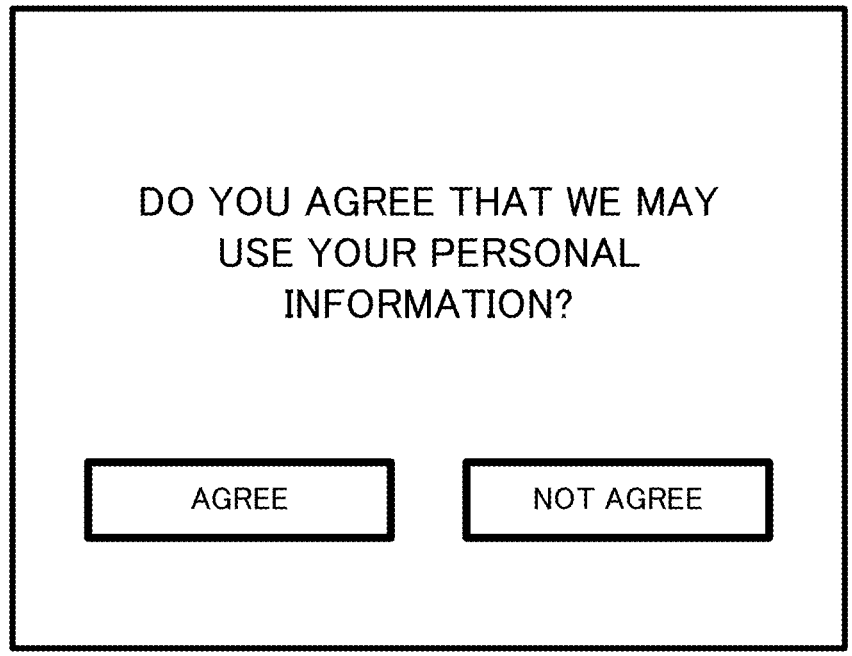
FIG. 18 is a diagram illustrating a display example of a UI when data about an unregistered person are stored.

As illustrated in FIG. 18, when the personal information about the unregistered person is stored, the display for obtaining the consent of the unregistered person may be displayed on a display of the UI. In the example illustrated in FIG. 18, when the unregistered person touches "YES," it is determined that the consent to the use of the personal information is obtained, and the personal information about the unregistered person is stored in the personal information storage unit 130. On the other hand, when the unregistered person touches "NO," it is determined that the consent to the use of the personal information is not obtained, and the personal information about the unregistered person is not stored in the personal information storage unit 130.

In the above-described example, the unregistered person is allowed to determine only whether or not to consent; however, for example, the unregistered person may be allowed to determine whether or not to use (store) the information for each type of the information. In this case, a list of the informations that are use targets may be displayed on the UI, and the unregistered person may be allowed to select the information that is usable.

(Technical Effect)

Next, a technical effect obtained by the threshold calculation system 10 according to the eighth example embodiment will be described.

As described with reference to FIG. 17 and FIG. 18, in the threshold calculation system according to the eighth example embodiment, the information about the unregistered person is stored in the personal information storage unit 130. As a result, it is possible to use the information about the unregistered person as the sample data, and it is consequently possible to estimate the population, more accurately.

<Supplementary Notes>

The example embodiments described above may be further described as, but not limited to, the following Supplementary Notes below.

(Supplementary Note 1)

A threshold calculation system described in Supplementary Note 1 is a threshold calculation system, including: a first acquisition unit that obtains a matching information that is used for matching of a biological body; a second acquisition unit that obtains an attribute information indicating an attribute of the biological body or an attribute of the matching information; a storage unit that stores the matching information and the attribute information for each biological body; a sampling unit that extracts, as sample data, a plurality of matching informations from the storage unit, on the basis of a predetermined condition about the attribute information; a population estimation unit that estimates a population from the sample data; and a threshold calculation unit that calculates a threshold related to the matching information, on the basis of a distribution of the estimated population.

(Supplementary Note 2)

A threshold calculation system described in Supplementary Note 2 is the threshold calculation system described in Supplementary Note 1, further including: an image acquisition unit that obtains an image including a biological body; and a feature data extraction unit that extracts a feature data of the biological body from the image, wherein the storage unit stores, as the matching data, at least one of the feature data and a matching score that is obtained by comparing feature quantities of living bodies.

(Supplementary Note 3)

A threshold calculation system described in Supplementary Note 3 is the threshold calculation system described in Supplementary Note 1 or 2, wherein the attribute information includes a personal attribute information indicating a personal attribute of the biological body.

(Supplementary Note 4)

A threshold calculation system described in Supplementary Note 4 is the threshold calculation system described in Supplementary Note 3, wherein the predetermined condition is related to a ratio of the attribute indicated by the personal attribute information.

(Supplementary Note 5)

A threshold calculation system described in Supplementary Note 5 is the threshold calculation system described in any one of Supplementary Notes 1 to 4, wherein the attribute information includes an environment attribute information indicating an environment in which the matching information is obtained.

(Supplementary Note 6)

A threshold calculation system described in Supplementary Note 6 is the threshold calculation system described in Supplementary Note 5, wherein the predetermined condition is related to a similarity degree of the environmental attribute information, or a level of the environmental attribute information.

(Supplementary Note 7)

A threshold calculation system described in Supplementary Note 7 is the threshold calculation system described in any one of Supplementary Notes 1 to 6, further including: an accumulation unit that accumulates a result of an authentication process performed by a comparison between the matching information and the threshold; and a condition change unit that changes the predetermined condition on the basis of the accumulated result.

(Supplementary Note 8)

A threshold calculation system described in Supplementary Note 8 is the threshold calculation system described in Supplementary Note 7, wherein the sampling unit extracts the sample data when the predetermined condition is changed.

(Supplementary Note 9)

A threshold calculation system described in Supplementary Note 9 is the threshold calculation system described in any one of Supplementary Notes 1 to 8, wherein the sampling unit extracts the sample data when a new matching information and a new attribute information are stored in the storage unit.

(Supplementary Note 10)

A threshold calculation system described in Supplementary Note 10 is the threshold calculation system described in any one of Supplementary Notes 1 to 9, wherein the storage unit stores the matching information and the attribution information, with respect to a biological body for whom an authentication process performed by a comparison between the matching information and the threshold is failed.

(Supplementary Note 11)

A threshold calculation method described in Supplementary Note 11 is a threshold calculation method, including: obtaining a matching information that is used for matching of a biological body; obtaining an attribute information indicating an attribute of the biological body or an attribute of the matching information; storing the matching information and the attribute information for each biological body; extracting, as sample data, a plurality of matching informations from the storage unit, on the basis of a predetermined condition about the attribute information; estimating a population from the sample data; and calculating a threshold related to the matching information, on the basis of a distribution of the estimated population.

(Supplementary Note 12)

A computer program described in Supplementary Note 12 is a computer program that operates a computer: to obtain a matching information that is used for matching of a biological body; to obtain an attribute information indicating an attribute of the biological body or an attribute of the matching information; to store the matching information and the attribute information for each biological body; to extract, as sample data, a plurality of matching informations from the storage unit, on the basis of a predetermined condition about the attribute information; to estimate a population from the sample data; and to calculate a threshold related to the matching information, on the basis of a distribution of the estimated population.

(Supplementary Note 13)

A recording medium described in Supplementary Note 13 is a recording medium on which the computer program described in Supplementary Note 12 is recorded.

This disclosure is not limited to the examples described above and is allowed to be changed, if desired, without departing from the essence or spirit of this disclosure which can be read from the claims and the entire specification. A threshold calculation system, a threshold calculation method, and a computer program with such changes are also intended to be within the technical scope of this disclosure.

DESCRIPTION OF REFERENCE CODES

10 Threshold calculation system
11 Processor
14 Storage apparatus
16 Output apparatus
50 Image acquisition unit
110 Matching information acquisition unit
111 Feature data acquisition unit
112 Matching score calculation unit
120 Attribute information acquisition unit
130 Personal information storage unit
140 Sampling unit
150 Population estimation unit
160 Threshold calculation unit
170 Matching determination unit
180 Authentication status storage unit
190 Condition change unit

What is claimed is:

1. A threshold calculation system, comprising:
    at least one memory that is configured to store instructions; and
    at least one first processor that is configured to execute the instructions to obtain a matching information that is used for matching of a biological body;
    obtain an attribute information indicating an attribute of the biological body or an attribute of the matching information;
    store the matching information and the attribute information for each biological body;
    extract, as sample data, a plurality of matching information, based on a predetermined condition about the attribute information;
    estimate a population from the sample data;
    calculate a threshold related to the matching information, based on a distribution of the estimated population;
    perform an authentication process based on a comparison between the matching information and the threshold; and
    control a gate based on a result of the authentication process,
    wherein the attribute information includes an environment attribute information indicating an environment in which the matching information is obtained,
    wherein the environment attribute information indicates pixel brightness, and
    wherein the at least one first processor is further configured to execute the instructions to extract the plurality of matching information as the sample data based on the pixel brightness.

2. The threshold calculation system according to claim 1, further comprising: a second processor that is configured to execute instructions to
    obtain an image including a biological body; and
    feature data extract a feature data of the biological body from the image, wherein
    the at least one first processor is configured to execute the instructions to store, as the matching information, at least one of the feature data and a matching score that is obtained by comparing feature quantities of living bodies.

3. The threshold calculation system according to claim 1, wherein the attribute information includes a personal attribute information indicating a personal attribute of the biological body.

4. The threshold calculation system according to claim 3, wherein the predetermined condition is related to a ratio of the attribute indicated by the personal attribute information.

5. The threshold calculation system according to claim 1, wherein the predetermined condition is related to a similarity degree of the environment attribute information, or a level of the environment attribute information.

6. The threshold calculation system according to claim 1, further comprising: a third processor that is configured to execute instructions to
  accumulate a result of the authentication process performed by a comparison between the matching information and the threshold; and
  change the predetermined condition based on the accumulated result.

7. The threshold calculation system according to claim 6, wherein the at least one first processor is configured to execute the instructions to extract the sample data when the predetermined condition is changed.

8. The threshold calculation system according to claim 1, wherein the at least one first processor is configured to execute the instructions to extract the sample data when a new matching information and a new attribute information are stored.

9. The threshold calculation system according to claim 1, wherein the at least one first processor is configured to execute the instructions to store the matching information and the attribute information, with respect to a biological body for whom an authentication process performed by a comparison between the matching information and the threshold is failed.

10. A threshold calculation method, comprising:
  obtaining a matching information that is used for matching of a biological body;
  obtaining an attribute information indicating an attribute of the biological body or an attribute of the matching information;
  storing the matching information and the attribute information for each biological body;
  extracting, as sample data, a plurality of matching information, based on a predetermined condition about the attribute information;
  estimating a population from the sample data;
  calculating a threshold related to the matching information, based on a distribution of the estimated population;
  performing an authentication process based on a comparison between the matching information and the threshold; and
  controlling a gate based on a result of the authentication process,
  wherein the attribute information includes an environment attribute information indicating an environment in which the matching information is obtained,
  wherein the environment attribute information indicates pixel brightness, and
  wherein the extracting the plurality of matching information as the sample data is based on the pixel brightness.

11. The threshold calculation system according to claim 1, wherein the environment attribute information indicates an imaging parameter information, light source intensity, background type, image quality, color tone, and the pixel brightness.

12. The threshold calculation system according to claim 11, wherein the at least one first processor is further configured to execute the instructions to extract the plurality of matching information as the sample data based on the imaging parameter information, the light source intensity, the background type, the image quality, the color tone, and the pixel brightness.

13. The threshold calculation system according to claim 1, wherein the at least one first processor is further configured to execute the instructions to provide a notification indicating the threshold has been calculated.

14. The threshold calculation system according to claim 1, wherein the at least one first processor is further configured to execute the instructions to control the gate to open based on the result indicating the authentication process has succeeded.

15. The threshold calculation system according to claim 14, wherein the at least one first processor is further configured to execute the instructions to control the gate to close based on the result indicating the authentication process has failed.

16. The threshold calculation system according to claim 1, wherein the at least one first processor is further configured to execute the instructions to calculate an interval upper limit based on the estimated population, and
  wherein the comparison is performed based on the interval upper limit.

* * * * *